US011486617B2

(12) United States Patent
Nishiyama

(10) Patent No.: US 11,486,617 B2
(45) Date of Patent: Nov. 1, 2022

(54) REFRIGERATION CYCLE APPARATUS

(71) Applicant: Mitsubishi Electric Corporation, Tokyo (JP)

(72) Inventor: Takumi Nishiyama, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 239 days.

(21) Appl. No.: 16/754,481

(22) PCT Filed: Oct. 27, 2017

(86) PCT No.: PCT/JP2017/038871
§ 371 (c)(1),
(2) Date: Apr. 8, 2020

(87) PCT Pub. No.: WO2019/082372
PCT Pub. Date: May 2, 2019

(65) Prior Publication Data
US 2020/0256590 A1 Aug. 13, 2020

(51) Int. Cl.
*F25B 41/34* (2021.01)
*F25B 13/00* (2006.01)
(Continued)

(52) U.S. Cl.
CPC ............. *F25B 41/34* (2021.01); *F25B 13/00* (2013.01); *F25B 40/02* (2013.01); *F25B 41/39* (2021.01);
(Continued)

(58) Field of Classification Search
CPC .......... F25B 13/00; F25B 40/02; F25B 41/31; F25B 41/385; F25B 2313/0314;
(Continued)

(56) References Cited

U.S. PATENT DOCUMENTS

RE43,998 E * 2/2013 Aoki .................. F25B 40/00
62/504
2009/0025420 A1 1/2009 Kojima et al.
(Continued)

FOREIGN PATENT DOCUMENTS

AU 2016279490 A1 2/2018
CN 203824153 U 9/2014
(Continued)

OTHER PUBLICATIONS

Su et al., Heat Pump System for Air Conditioning Under a Low Temperature and a Using Method Thereof, May 31, 2007, WO2007059709A1, Whole Document (Year: 2007).*
(Continued)

*Primary Examiner* — Larry L Furdge
(74) *Attorney, Agent, or Firm* — Posz Law Group, PLC

(57) ABSTRACT

A refrigeration cycle apparatus includes an outdoor unit including a compressor, a first heat exchanger, and a first expansion valve, an indoor unit including a second expansion valve and a second heat exchanger, and a first pipe and a second pipe connected between the outdoor unit and the indoor unit. In a cooling operation, refrigerant delivered from the compressor sequentially passes through the first heat exchanger, the first expansion valve, the first pipe, the second expansion valve, the second heat exchanger, and the second pipe and returns to the compressor, and in the cooling operation, the first expansion valve converts refrigerant from a liquid-phase state to a two-phase state and sends two-phase refrigerant to the first pipe.

6 Claims, 14 Drawing Sheets

(51) Int. Cl.
*F25B 40/02* (2006.01)
*F25B 41/39* (2021.01)
*F25B 41/385* (2021.01)

(52) U.S. Cl.
CPC ..... *F25B 41/385* (2021.01); *F25B 2313/0314* (2013.01); *F25B 2313/0315* (2013.01); *F25B 2600/2513* (2013.01)

(58) Field of Classification Search
CPC ...... F25B 2313/0315; F25B 2600/2513; F25B 41/39; F25B 2313/005; F25B 2400/053; F25B 2400/054; F25B 2700/21151
See application file for complete search history.

(56) References Cited

U.S. PATENT DOCUMENTS

| | | | |
|---|---|---|---|
| 2010/0064713 A1* | 3/2010 | Thomas | F25B 41/31 29/726 |
| 2014/0373569 A1 | 12/2014 | Tsuboe et al. | |
| 2015/0096320 A1 | 4/2015 | Kamiya et al. | |
| 2015/0338121 A1 | 11/2015 | Yamashita | |
| 2016/0040896 A1 | 2/2016 | Hong et al. | |
| 2017/0146269 A1 | 5/2017 | Ishiyama et al. | |
| 2018/0372379 A1 | 12/2018 | Kamitani et al. | |

FOREIGN PATENT DOCUMENTS

| | | | | |
|---|---|---|---|---|
| CN | 105190199 A | 12/2015 | | |
| EP | 2144018 A1 | 1/2010 | | |
| EP | 2211123 A1 * | 7/2010 | ............. | F25B 49/02 |
| EP | 2 314 957 A2 | 4/2011 | | |
| EP | 2535669 A2 | 12/2012 | | |
| EP | 3059521 A1 | 8/2016 | | |
| EP | 3088811 A1 | 11/2016 | | |
| JP | 07-035390 A | 2/1995 | | |
| JP | H07-120080 A | 5/1995 | | |
| JP | 2006-183907 A | 7/2006 | | |
| JP | 2007-187420 A | 7/2007 | | |
| JP | 2010236727 A * | 10/2010 | ............. | F25B 13/00 |
| JP | 2011-099591 A | 5/2011 | | |
| JP | 2013-053849 A | 3/2013 | | |
| JP | 2013-200090 A | 10/2013 | | |
| JP | 2015-078800 A | 4/2015 | | |
| JP | 2017-009155 A | 1/2017 | | |
| WO | WO-2007059709 A1 * | 5/2007 | ............. | F25B 13/00 |
| WO | 2016/013077 A1 | 1/2016 | | |
| WO | 2016/051606 A1 | 4/2016 | | |
| WO | 2016/204194 A1 | 12/2016 | | |
| WO | 2016204194 A1 | 12/2016 | | |
| WO | 2017/094172 A1 | 6/2017 | | |

OTHER PUBLICATIONS

Yasuda et al., Multiple Type Air Conditioner, Oct. 21, 2010, JP2010236727A, Whole Document (Year: 2010).*
Chinese Office Action dated Mar. 3, 2021, issued in corresponding Chinese Patent Application No. 201780096117.6 (and English Machine Translation).
Office Action dated Jun. 29, 2021, issued in corresponding AU Patent Application No. 2017436890.
Extended European Search Report dated Oct. 15, 2020 issued in corresponding EP patent application 17930030.6.
Re-Issued Office Action dated Sep. 27, 2021, issued in corresponding AU Patent Application No. 2017436890.
Japanese Office Action dated Feb. 16, 2021, issued in corresponding JP Patent Application No. 2019-549799 (and English Machine Translation).
International Search Report of the International Searching Authority dated Jan. 16, 2018 for the corresponding International application No. PCT/JP2017/038871 (and English translation).

* cited by examiner

|  | COOLING | | HEATING | |
|---|---|---|---|---|
|  | COMPARATIVE EXAMPLE | NOVEL CONTROL | COMPARATIVE EXAMPLE | NOVEL CONTROL |
| EXPANSION VALVE(43) | SC CONTROL | SC CONTROL ($\varepsilon$) | SUCTION SH CONTROL | SUCTION SH CONTROL |
| EXPANSION VALVE(41) | SUCTION SH CONTROL | SUCTION SH CONTROL | SC CONTROL | FULLY OPEN |
| EXPANSION VALVE(42) | - | FULLY OPEN | - | INTERMEDIATE PRESSURE CONTROL |

$\varepsilon = \dfrac{T10a - T10b}{T10a - Taout}$

FIG.18

|  | COOLING | HEATING |
|---|---|---|
| EXPANSION VALVE(43) | SC CONTROL($\varepsilon$) | SUCTION SH CONTROL |
| EXPANSION VALVE(41) | SUCTION SH CONTROL | FULLY OPEN |
| EXPANSION VALVE(42-1) | EVAPORATION SH CONTROL | SC CONTROL($\varepsilon$) |
| EXPANSION VALVE(42-2) | EVAPORATION SH CONTROL | SC CONTROL($\varepsilon$) |
| EXPANSION VALVE(42) | FULLY OPEN | INTERMEDIATE PRESSURE CONTROL |

REFRIGERATION CYCLE APPARATUS

CROSS REFERENCE TO RELATED APPLICATION

This application is a U.S. national stage application of International Application PCT/JP2017/038871 filed on Oct. 27, 2017, the contents of which are incorporated herein by reference.

TECHNICAL FIELD

The present invention relates to a refrigeration cycle apparatus and particularly to a refrigeration cycle apparatus including a plurality of expansion valves.

BACKGROUND

A refrigeration cycle apparatus capable of suppressing lowering in efficiency while using refrigerant low in global warming potential (GWP) and also achieving a smaller pipe diameter of a connection pipe has been proposed (see, for example, Japanese Patent Laying-Open No. 2013-200090).

PATENT LITERATURE

PTL 1: Japanese Patent Laying-Open No. 2013-200090

As shown in Japanese Patent Laying-Open No. 2013-200090, decrease in pipe diameter can allow decrease in volume, which in turn allows reduction in amount of refrigerant and reduction in amount of use of copper and ultimately to reduction in cost. On the other hand, the pipe diameter greatly affects pressure loss and decrease in pipe diameter leads to poorer capability or significant limitation of an operating range of a refrigeration cycle apparatus. In an example where apparatuses and pipes have already been provided as in a packaged air-conditioner, when a pipe diameter is comparable, an already provided pipe can be reused. When a pipe diameter is made smaller, however, a pipe should be replaced and hence cost is disadvantageously increased for loads imposed by works.

Even in a refrigeration cycle apparatus comparable in capability, when a longer pipe that connects an indoor unit and an outdoor unit to each other is employed, increase in required amount of refrigerant is disadvantageously large.

SUMMARY

The present invention was made to solve problems as above, and an object thereof is to provide a refrigeration cycle apparatus capable of realizing an optimal operation while reducing a required amount of refrigerant also when a pipe is long.

A refrigeration cycle apparatus according to the present disclosure includes an outdoor unit including a compressor, a first heat exchanger, and a first expansion valve, an indoor unit including a second expansion valve and a second heat exchanger, and a first pipe and a second pipe connected between the outdoor unit and the indoor unit. In a cooling operation, refrigerant delivered from the compressor sequentially passes through the first heat exchanger, the first expansion valve, the first pipe, the second expansion valve, the second heat exchanger, and the second pipe and returns to the compressor. In the cooling operation, the first expansion valve converts refrigerant from a liquid-phase state to a two-phase state and sends two-phase refrigerant to the first pipe.

According to the present invention, refrigerant in the first pipe connected between the outdoor unit and the indoor unit is in a two-phase state rather than a liquid-phase state, and therefore an amount of refrigerant required when a pipe is long can be decreased.

BRIEF DESCRIPTION OF DRAWINGS

FIG. 18 is a diagram showing control of each expansion valve during cooling and heating in the fourth embodiment.

DETAILED DESCRIPTION

Figure 1:
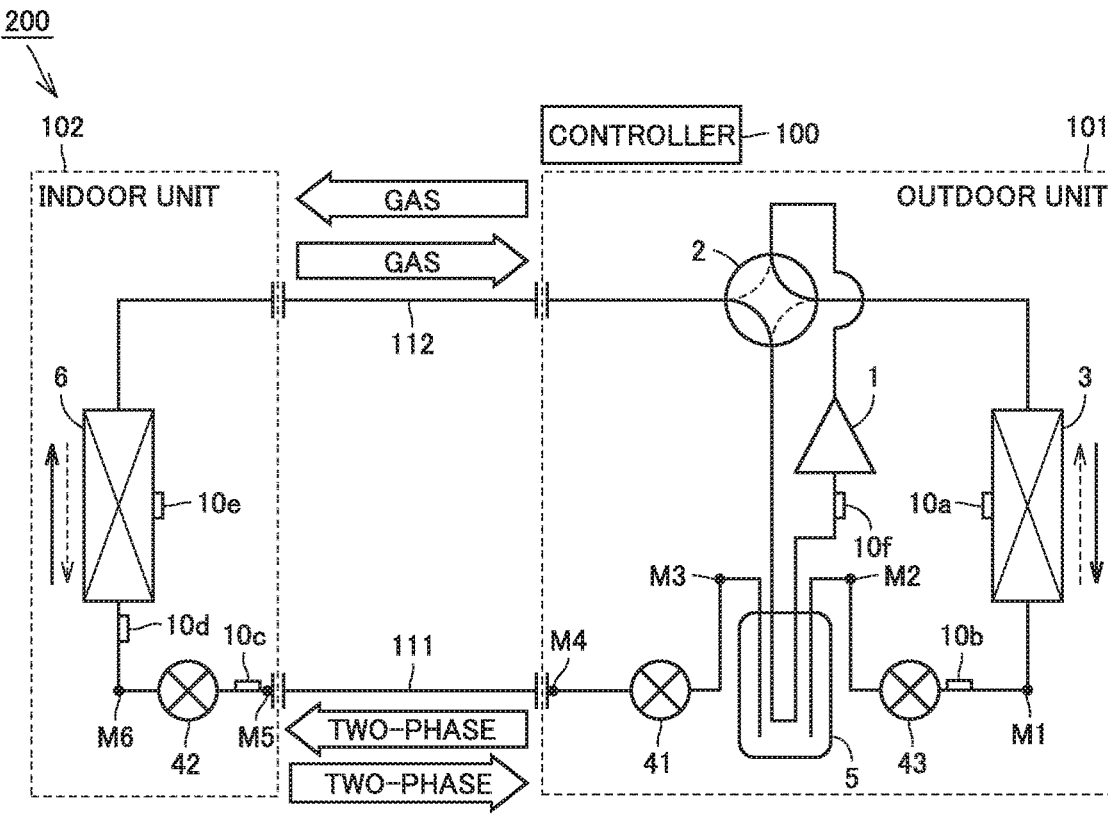
FIG. 1 is a diagram showing a configuration of a refrigeration cycle apparatus 200 and a flow of refrigerant according to a first embodiment.

An embodiment of the present invention will be described below in detail with reference to the drawings. In the drawings below, relation in size among constituent members may be different from actual relation. The same or corresponding elements in the drawings below have the same reference characters allotted, which is common throughout the full text of the specification. A form of a constituent element represented in the full text of the specification is merely by way of example and limitation to such description is not intended.

First Embodiment

FIG. 1 is a diagram showing a configuration of a refrigeration cycle apparatus 200 together with a flow of refrigerant according to a first embodiment. As shown in FIG. 1, refrigeration cycle apparatus 200 includes an outdoor unit 101 and an indoor unit 102.

Outdoor unit 101 includes a compressor 1, a four-way valve 2, an outdoor heat exchanger 3, a receiver 5, expansion valves 41 and 43, and temperature sensors 10a, 10b, and 10f. A controller 100 may be arranged in outdoor unit 101, although arrangement thereof is not particularly limited. Indoor unit 102 includes an indoor heat exchanger 6, an expansion valve 42, and temperature sensors 10c, 10d, and 10e.

Outdoor unit 101 and indoor unit 102 are connected to each other through pipes 111 and 112. Though not particularly limited, pipe 112 (gas pipe) is larger in diameter than pipe 111 (liquid pipe).

Compressor 1 compresses low-pressure gas refrigerant with heat being insulated, and delivers high-pressure gas refrigerant. Each of expansion valves 41 to 43 is configured to send liquid refrigerant with a pressure thereof being reduced. For example, a linear expansion valve (LEV) can be employed for expansion valves 41 to 43.

Receiver 5 can store refrigerant and accommodate variation in amount of circulated refrigerant due to variation in load. Receiver 5 is used for storing in advance, in preparation for variation in length of a refrigerant pipe depending on a location where the pipe is provided, refrigerant in an amount corresponding to such variation.

Controller 100 controls a drive frequency of compressor 1 so as to control an amount of refrigerant delivered by compressor 1 per unit time. Controller 100 controls four-way valve 2 to switch a direction of circulation of refrigerant. Controller 100 controls opening of expansion valves 41 to 43. Controller 100 obtains a temperature of refrigerant at each portion from temperature sensors 10a to 10e. Temperature sensors 10a to 10e are each implemented, for example, by a thermistor.

In a cooling operation, refrigerant circulates to pass through an internal flow path defined by compressor 1, four-way valve 2, outdoor heat exchanger 3, expansion valve 43, receiver 5, expansion valve 41, pipe 111, expansion valve 42, indoor heat exchanger 6, pipe 112, four-way valve 2, and receiver 5, and to return to compressor 1.

Four-way valve 2 representing an exemplary flow path switching valve connects an outlet port of compressor 1 and outdoor heat exchanger 3 to each other and connects pipe 112 and the internal flow path in receiver 5 to each other in the cooling operation.

Refrigerant flows from compressor 1 via four-way valve 2 into outdoor heat exchanger 3. Outdoor heat exchanger 3 functions as a condenser in the cooling operation. Gas refrigerant from compressor 1 is condensed as it dissipates heat of condensation in outdoor heat exchanger 3 and becomes liquid refrigerant.

Refrigerant condensed in outdoor heat exchanger 3 is reduced in pressure in expansion valve 43. Refrigerant reduced in pressure in expansion valve 43 passes through receiver 5 and thereafter reaches expansion valve 41. Refrigerant throttled down by expansion valve 41 reaches indoor heat exchanger 6 through pipe 111 and expansion valve 42.

Indoor heat exchanger 6 functions as an evaporator in the cooling operation. Refrigerant from expansion valve 42 absorbs heat of vaporization from indoor air in indoor heat exchanger 6 and is vaporized. Refrigerant that has evaporated in indoor heat exchanger 6 returns to compressor 1 through four-way valve 2 and receiver 5.

Refrigerant from outdoor heat exchanger 3 passes through expansion valve 43 and thereafter is cooled by exchanging in receiver 5, heat with gas refrigerant from indoor heat exchanger 6.

In a heating operation, refrigerant circulates to flow through an internal flow path defined by compressor 1, four-way valve 2, pipe 112, indoor heat exchanger 6, expansion valve 42, pipe 111, expansion valve 41, receiver 5, expansion valve 43, outdoor heat exchanger 3, four-way valve 2, and receiver 5 and to return to compressor 1.

In the heating operation, outdoor heat exchanger 3 functions as an evaporator and indoor heat exchanger 6 functions as a condenser. In the heating operation, refrigerant passes from compressor 1 through four-way valve 2 and pipe 112 and is condensed in indoor heat exchanger 6. Refrigerant condensed in indoor heat exchanger 6 is reduced in pressure in expansion valve 42. Refrigerant reduced in pressure in expansion valve 42 passes through pipe 111, expansion valve 41, and receiver 5, thereafter is further reduced in pressure in expansion valve 43, and reaches outdoor heat exchanger 3. Refrigerant that has evaporated in outdoor heat exchanger 3 returns to compressor 1 through four-way valve 2 and receiver 5.

In the present embodiment, controller 100 controls opening of expansion valves 41 to 43 such that refrigerant in a two-phase state flows through pipe 111 and refrigerant in a gaseous state flows through pipe 112. By setting a state at inlets of at least two expansion valves to the liquid state in any operation state of cooling and heating, control is facilitated. By switching a method of controlling each expansion valve and carrying out control in accordance with an operating state, the operating state can be maintained, adaptation to long and short lengths of pipe 111 can be made, and an amount of refrigerant can be decreased.

Figure 2:
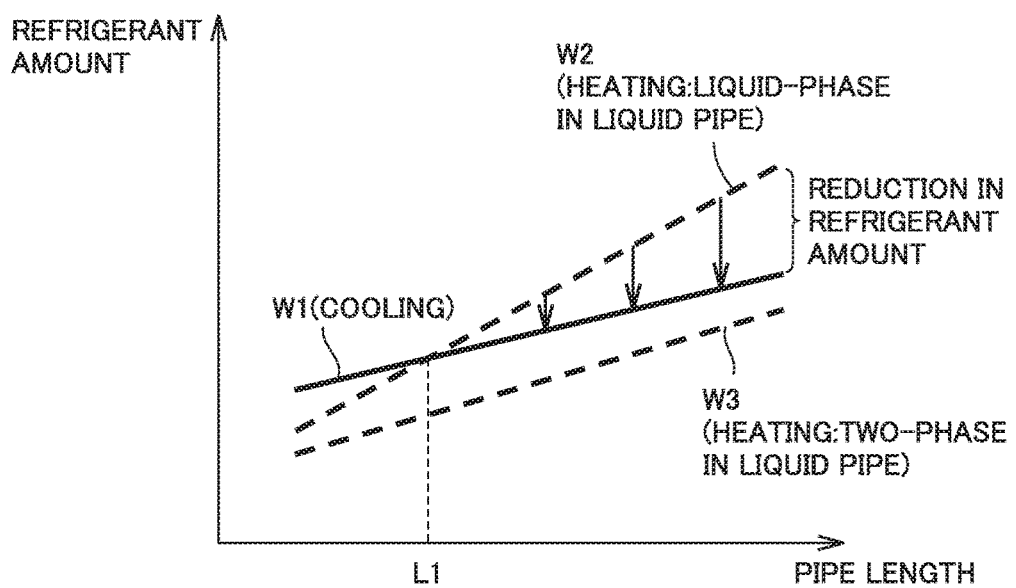
FIG. 2 is a diagram for illustrating relation between a length of a pipe and a required amount of refrigerant.

FIG. 2 is a diagram for illustrating relation between a length of a pipe and a required amount of refrigerant. In FIG. 2, the abscissa represents a pipe length and the ordinate represents a required amount of refrigerant. In a configuration in which a single expansion valve is provided only in an outdoor unit (a configuration without expansion valve 42 in FIG. 1), in pipe 111, two-phase refrigerant after passage through expansion valve 41 flows during cooling and liquid refrigerant before passage through expansion valve 41 flows during heating. As shown with lines W1 and W2, on the assumption that refrigerant that flows through pipe 111 during heating is in a liquid phase, when a pipe length is shorter than L1, an amount of refrigerant is determined by an amount of refrigerant necessary for cooling, whereas when a pipe length is longer than L1, an amount of refrigerant is determined by an amount of refrigerant necessary for heating.

In the present embodiment, expansion valve 41 is arranged on a side of the outdoor unit and expansion valve 42 is arranged on a side of the indoor unit. According to such a configuration, as shown with a line W3, refrigerant that flows through pipe 111 during heating can also be controlled to be in a two-phase state. Line W3 is lower than line W1 in rate of increase (inclination of a graph) of refrigerant with increase in pipe length. Consequently, an amount of refrigerant necessary for cooling is dominant also when the pipe length is longer than L1, and an amount of refrigerant required in the refrigeration cycle apparatus can be decreased by an amount corresponding to an amount shown with an arrow in FIG. 2.

Figures 3, 4:
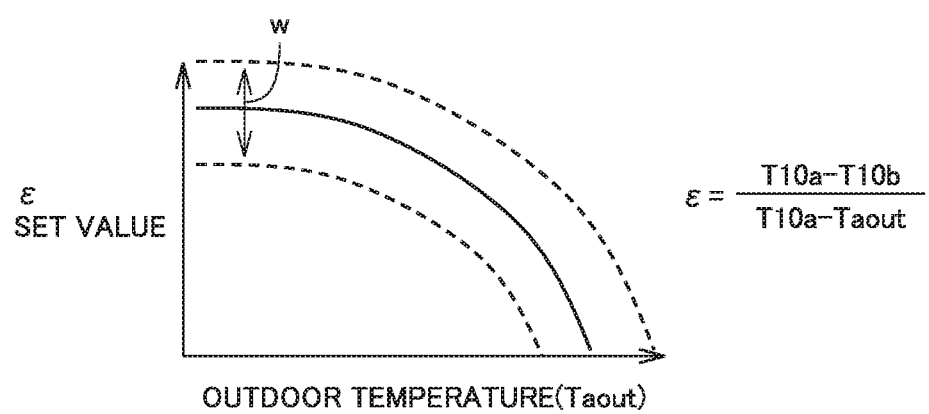
FIG. 3 is a diagram showing control of each expansion valve during cooling and heating in the first embodiment.
FIG. 4 is a diagram showing an allowable range of set values of a parameter E.

FIG. 3 is a diagram showing control of each expansion valve during cooling and heating in the first embodiment. A method of controlling refrigerant in pipe 111 to be in the liquid state (corresponding to W1 and W2 in FIG. 2) is shown as a comparative example and a control method performed in the present embodiment (corresponding to W1 and W3 in FIG. 2) is shown as novel control. A refrigeration cycle apparatus in the comparative example is configured with expansion valve 42 having been eliminated from the configuration shown in FIG. 1, although it is not shown.

In the cooling operation, in the refrigeration cycle apparatus in the comparative example, expansion valve 43 is controlled under SC control and expansion valve 41 is controlled under suction SH control.

SC control refers to control for changing opening of expansion valve 43 such that a temperature difference $\Delta Tab$ ($=T10a-T10b$) between a temperature in a middle part of outdoor heat exchanger 3 (detected by temperature sensor 10a) and a temperature at an outlet of outdoor heat exchanger 3 (detected by temperature sensor 10b) attains to a value set in advance.

Suction SH control refers to control for changing opening of expansion valve 41 such that a temperature difference $\Delta Tef$ ($=T10f-T10e$) between a temperature in a middle part of indoor heat exchanger 6 (detected by temperature sensor 10e) and a temperature at the time of suction into compressor 1 (detected by temperature sensor 10f) attains to a value set in advance.

Under novel control carried out in the present embodiment, in the cooling operation, expansion valve 43 is controlled under SC control ($\varepsilon$), expansion valve 41 is controlled under suction SH control, and expansion valve 42 is fully opened. Though suction SH control is the same as suction SH control in the comparative example, SC control ($\varepsilon$) refers to control for changing opening of expansion valve 43 such that a newly introduced parameter $\varepsilon$ (epsilon) [$0 \leq \varepsilon \leq 1$] is within a range of values set in advance.

Parameter $\varepsilon$ is expressed as $\varepsilon = \Delta Tab/\Delta Tao$.

Temperature difference $\Delta Tab$ ($=T10a-T10b$) is a difference between a temperature in the middle part of outdoor heat exchanger 3 (detected by temperature sensor 10a) and a temperature at the outlet of outdoor heat exchanger 3 (detected by temperature sensor 10b). A temperature difference $\Delta Tao$ ($=T10a-T10aout$) is a difference between the temperature in the middle part of outdoor heat exchanger 3 (detected by temperature sensor 10a) and a temperature sensed by temperature sensor 10a before operation (an outdoor air Tout).

In the heating operation, in the refrigeration cycle apparatus in the comparative example, expansion valve 43 is controlled under suction SH control and expansion valve 41 is controlled under SC control.

SC control in this case refers to control for changing opening of expansion valve 41 such that a temperature difference $\Delta Ted$ ($=T10e-T10d$) between a temperature in the middle part of indoor heat exchanger 6 (detected by temperature sensor 10e) and a temperature at an outlet of indoor heat exchanger 6 (detected by temperature sensor 10d) attains to a value set in advance.

Suction SH control refers to control for changing opening of expansion valve 43 such that a temperature difference $\Delta Taf$ ($=T10f-T10a$) between a temperature in the middle part of outdoor heat exchanger 3 (detected by temperature sensor 10a) and a temperature at the time of suction into compressor 1 (detected by temperature sensor 10f) attains to a value set in advance.

Under novel control carried out in the present embodiment, in the heating operation, expansion valve 43 is controlled under suction SH control, expansion valve 41 is fully opened, and expansion valve 42 is controlled under intermediate pressure control. Though suction SH control is the same as suction SH control in the comparative example, intermediate pressure control refers to control for changing opening of expansion valve 42 such that a newly introduced parameter $\zeta$ (zeta) [$\zeta \geq 1$] is within a range of values set in advance.

Parameter $\zeta$ is expressed as $\zeta = \Delta Tdc/\Delta Ted$.

A temperature difference $\Delta Tdc$ ($=T10d-T10c$) is a difference between a temperature at the outlet of indoor heat exchanger 6 (detected by temperature sensor 10d) and a temperature at an outlet of expansion valve 42 (detected by temperature sensor 10c). A temperature difference $\Delta Ted$ ($=T10e-T10d$) is a difference between a temperature in the middle part of indoor heat exchanger 6 (detected by temperature sensor 10e) and a temperature at the outlet of indoor heat exchanger 6 (detected by temperature sensor 10d).

FIG. 4 is a diagram showing an allowable range of set values of parameter $\varepsilon$. Parameter $\varepsilon$ is set to be lower as outdoor air Taout is higher, and an allowable range of set values in consideration of a measurement error of a temperature sensor is shown with dashed lines above and below a set value shown with a solid line. Therefore, a range of values set in advance for parameter $\varepsilon$ can be defined as an area between two dashed lines shown with an arrow in FIG. 4.

A range of values also of parameter $\zeta$ set in advance may be determined similarly in consideration of a measurement error of a temperature sensor.

Figure 5:
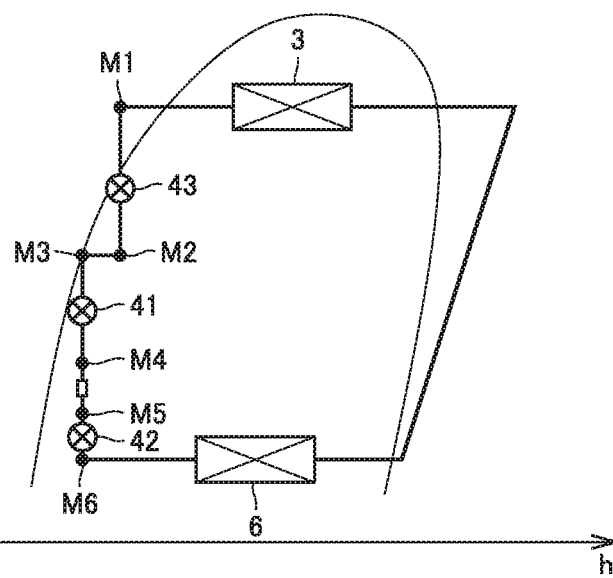
FIG. 5 is a P-H chart during a cooling operation when a pipe is short.
Figure 6:
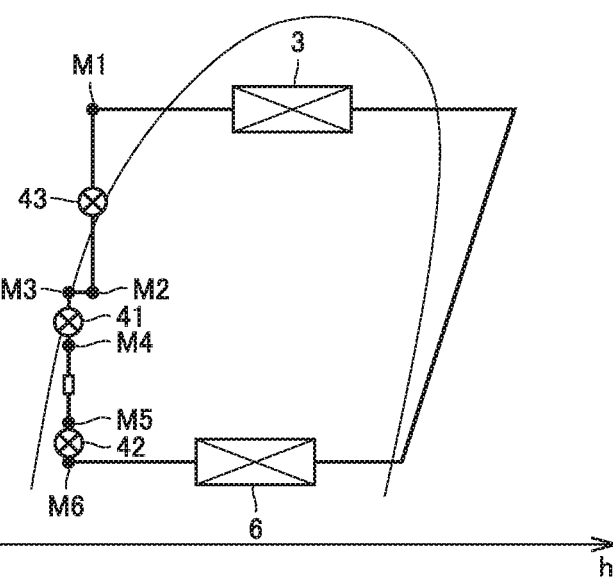
FIG. 6 is a P-H chart during a cooling operation when a pipe is long.

FIG. 5 is a P-H chart during a cooling operation when a pipe is short. FIG. 6 is a P-H chart during a cooling operation when a pipe is long. In FIGS. 5 and 6, points M1 to M6 correspond to points M1 to M6 in FIG. 1, respectively. From point M1 to point M2, refrigerant is reduced in pressure in expansion valve 43, and from point M2 to point M3, refrigerant is cooled in receiver 5. From point M3 to point M4, refrigerant is reduced in pressure in expansion valve 41.

Since pressure loss from point M4 to point M5 is greater in long pipe 111 than in short pipe 111, correspondingly, opening of expansion valve 41 is increased to lessen pressure reduction in expansion valve 41.

Figure 7:
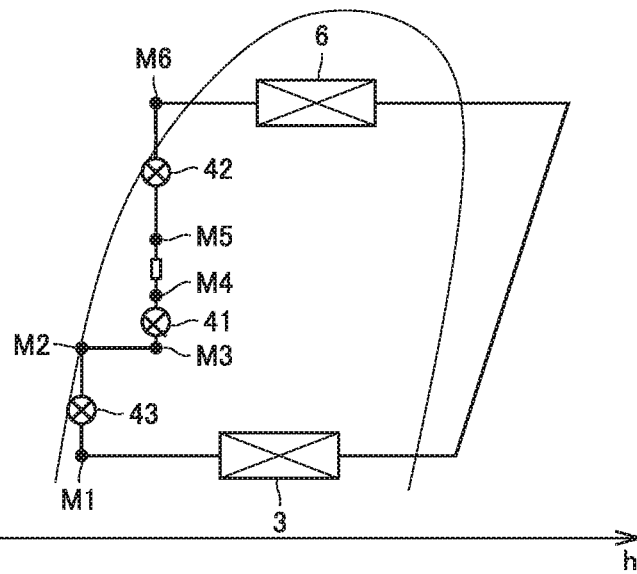
FIG. 7 is a P-H chart during a heating operation when a pipe is short.
Figure 8:
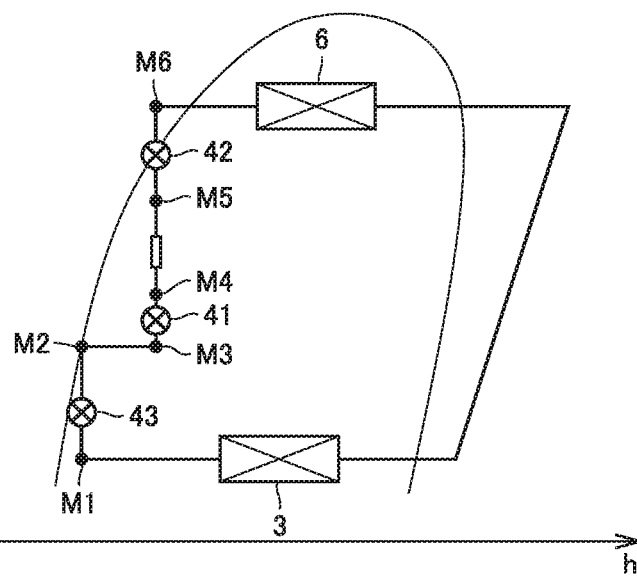
FIG. 8 is a P-H chart during a heating operation when a pipe is long.

FIG. 7 is a P-H chart during a heating operation when a pipe is short. FIG. 8 is a P-H chart during a heating operation when a pipe is long. In FIGS. 7 and 8, points M1 to M6 correspond to points M1 to M6 in FIG. 1, respectively. Since a direction of circulation of refrigerant is reverse, arrangement of points M1 to M6 is different from arrangement in FIGS. 5 and 6 in the cooling operation. From point M6 to point M5, refrigerant is reduced in pressure in expansion valve 42, from point M5 to point M4, pressure loss in accordance with a length of pipe 111 is produced, and from point M3 to point M2, refrigerant is cooled in receiver 5. From point M2 to point M1, refrigerant is reduced in pressure in expansion valve 43.

Since pressure loss from point M4 to point M5 is greater in long pipe 111 than in short pipe 111, correspondingly, opening of expansion valve 42 is increased to lessen pressure reduction in expansion valve 42.

Figure 9:
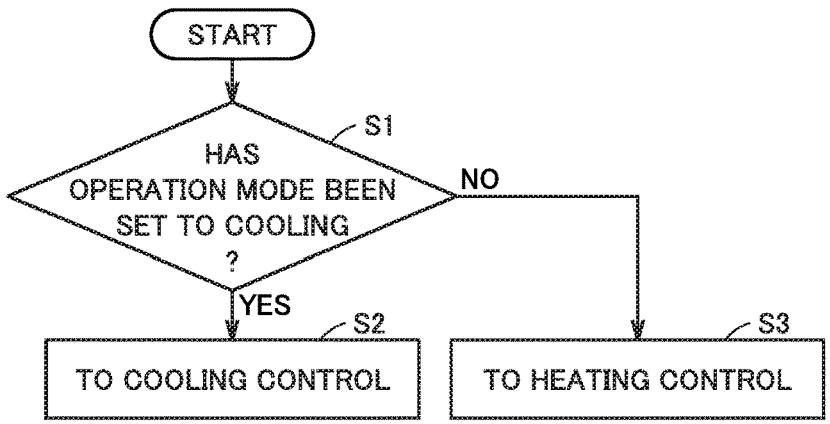
FIG. 9 is a flowchart showing processing for determining an operation mode.
Figure 10:
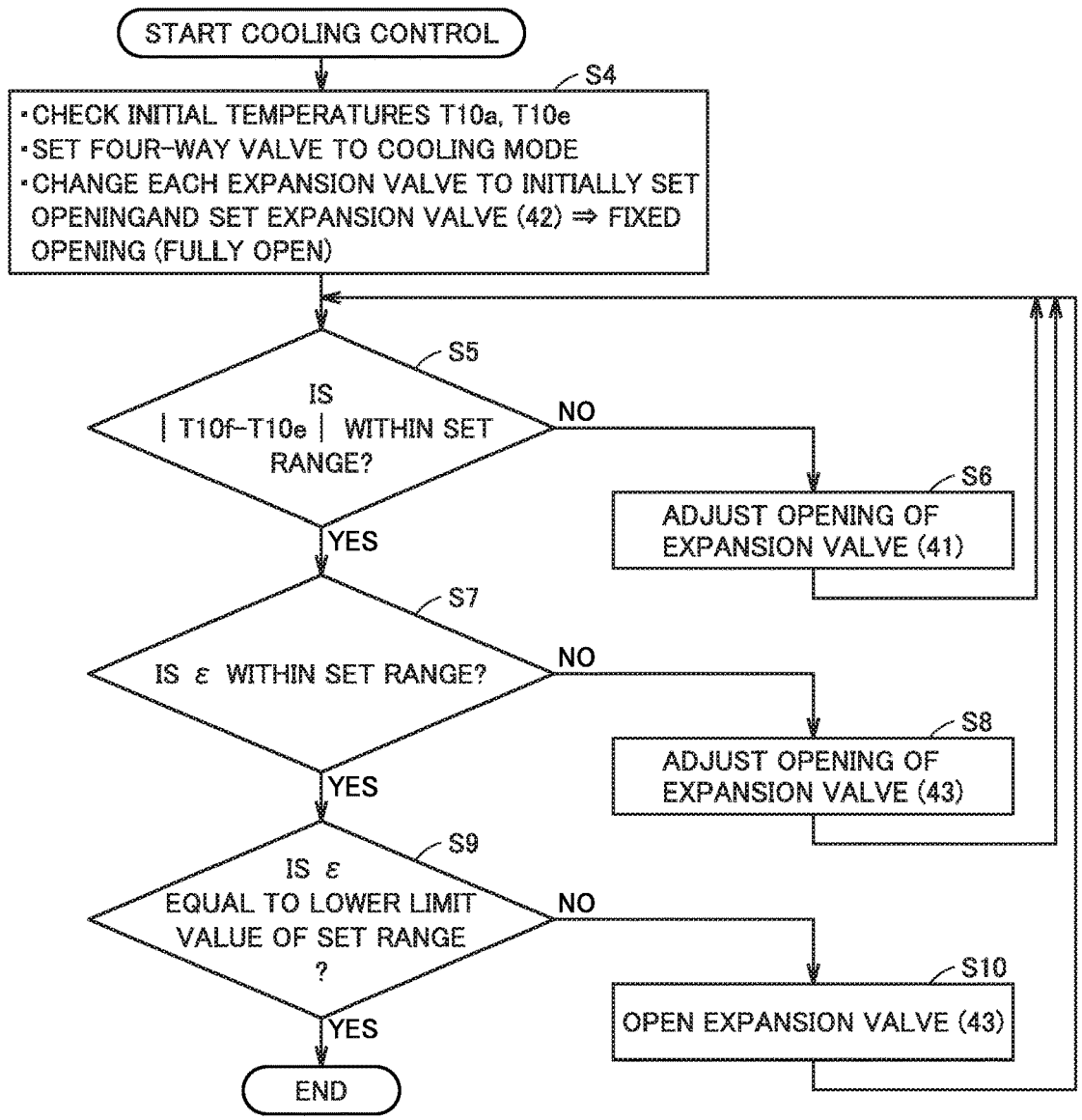
FIG. 10 is a flowchart showing processing in a cooling operation in the first embodiment.
Figure 11:
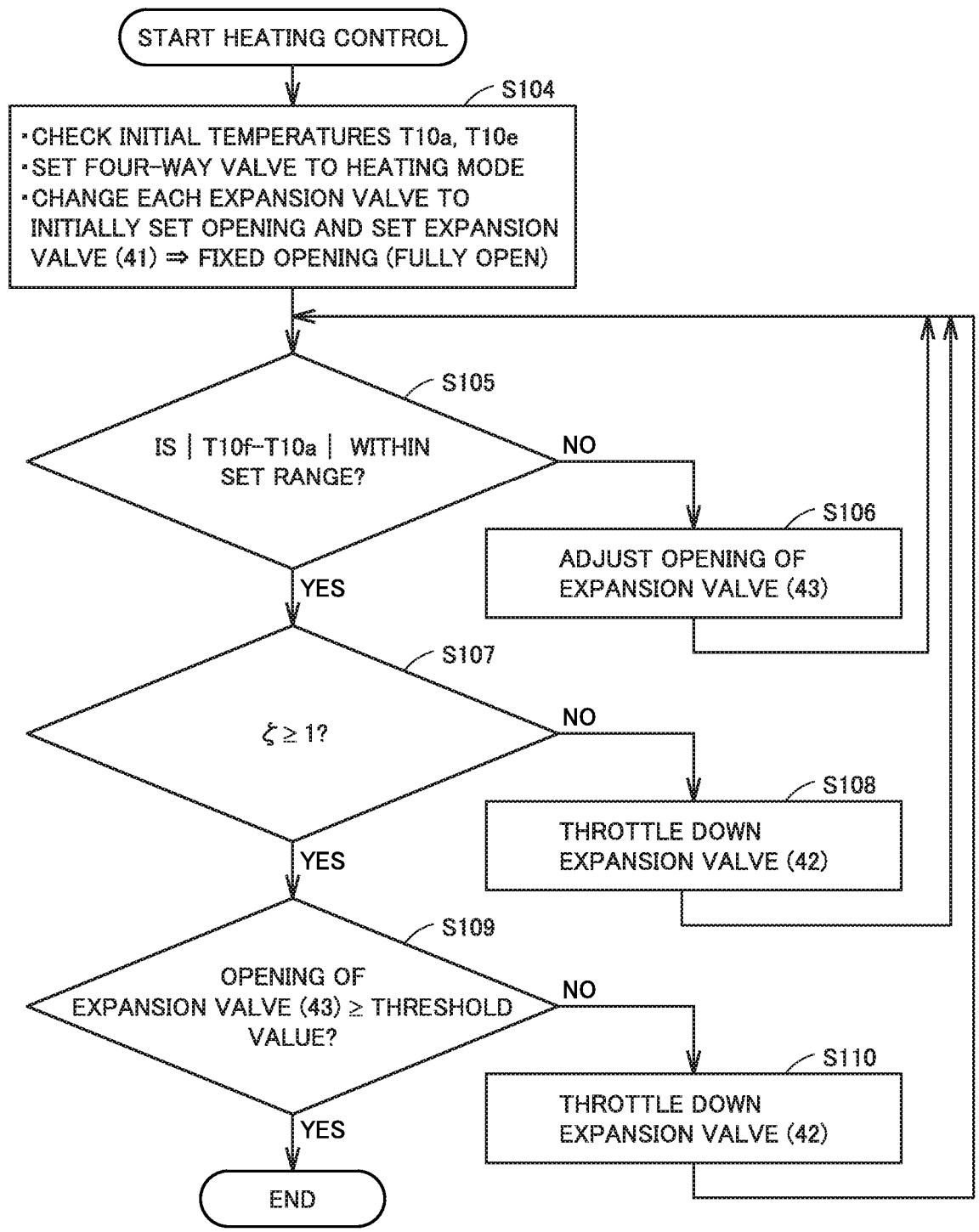
FIG. 11 is a flowchart showing processing in a heating operation in the first embodiment.

A flow of control by controller 100 will be described with reference to FIGS. 9 to 11. FIG. 9 is a flowchart showing processing for determining an operation mode. FIG. 10 is a flowchart showing processing in the cooling operation in the first embodiment. FIG. 11 is a flowchart showing processing in the heating operation in the first embodiment.

In FIG. 9, controller 100 determines an operation mode in step S1. In determination processing, controller 100 may directly read user setting, may make determination in accordance with a state of the four-way valve controlled under the user setting, or may make determination based on a result of sensing of a temperature by a temperature sensor (for example, temperature sensor 10a or 10e). When a result of determination indicates cooling in step S1, the process proceeds to step S2, and when a result of determination indicates heating, the process proceeds to step S3. In step S2, cooling control (FIG. 10) is carried out, and in step S3, heating control (FIG. 11) is carried out.

In cooling control in FIG. 10, in step S4, controller 100 initially checks an indoor temperature and an outdoor air temperature. Temperature sensors 10a and 10e can be used for checking. In checking, the temperature may be checked without operating each apparatus, or for example, a result of sensing after operation of an indoor or outdoor fan for an appropriate period of time may be used. In addition, controller 100 switches four-way valve 2 to a cooling mode (a flow path in four-way valve 2 shown with a solid line in FIG. 1). Expansion valves 41 and 43 are changed to initially set opening and expansion valve 42 is set to fixed opening (fully opened).

Thereafter, based on an operating state of the refrigeration cycle apparatus, expansion valve 41 is subjected to suction SH control in steps S5 and S6, and expansion valve 43 is subjected to SC control ($\varepsilon$) in steps S7 and S8.

In step S5, controller 100 determines whether or not a temperature difference between a temperature T10$f$ detected by temperature sensor 10$f$ and a temperature T10$e$ detected by temperature sensor 10$e$ is within a set range of superheating SH. When the temperature difference is within the set range (YES in S5), the process proceeds to step S7, and when the temperature difference is out of the set range (NO in S5), the process proceeds to step S6. When superheating SH is equal to or smaller than a lower limit of the set range, in step S6, there is possibility of a liquid refrigerant return state, and hence controller 100 throttles down expansion valve 41. When superheating is equal to or larger than an upper limit, refrigerant is excessively dry and a temperature at the time of delivery is high. Therefore, the controller opens expansion valve 41.

Opening of expansion valve 41 is preferably gradually changed because a state of a refrigeration cycle tends to be stable. In order to further shorten a time period for superheating SH to be within the set range, a degree of change in opening may be adjusted depending on magnitude of a difference from the set range. For example, when a difference between a threshold value and superheating SH is large, opening of the expansion valve may be controlled to increase, and when the difference between the threshold value and superheating SH is small, opening of the expansion valve may be controlled to decrease.

In step S7, controller 100 determines whether or not parameter $\varepsilon$ is within a range defined by the set threshold value. Parameter $\varepsilon$ [$0 \leq \varepsilon \leq 1$] is a value obtained based on a ratio between a temperature difference between the temperature in the middle part (temperature sensor 10a) of outdoor heat exchanger 3 and the temperature at the outlet (temperature sensor 10b) of outdoor heat exchanger 3 and a temperature difference between the temperature in the middle part (temperature sensor 10a) of outdoor heat exchanger 3 and a temperature sensed by temperature sensor 10a before operation.

When $\varepsilon$ is within the range (YES in S7), the process proceeds to step S9, and when $\varepsilon$ is out of the range (NO in S7), the process proceeds to step S8. When $\varepsilon$ is equal to or smaller than the lower limit of the set range, a set value of supercooling SC obtained from a condensation temperature of the condenser and a result of sensing of a temperature from an outlet of the condenser to an inlet of expansion valve 43 has not been held, and hence controller 100 throttles down expansion valve 43. In contrast, when $\varepsilon$ is equal to or larger than the upper limit of the set range, controller 100 increases opening of expansion valve 43. After opening of expansion valve 43 is changed, that opening is maintained for an appropriate time period and determination is made again in step S5.

When $\varepsilon$ is equal to the lower limit value of the set range in step S9, control ends, and otherwise, processing in step S10 is performed. When $\varepsilon$ is not equal to the lower limit value of the set range, in step S10, expansion valve 43 is opened so as to set $\varepsilon$ to the lower limit value (so as not to produce a pressure difference on a high-pressure side) and determination is made again in step S5.

While supercooling SC and superheating SH are maintained within a target range under the control in the cooling operation above, minimum necessary supercooling SC is secured and a degree of dryness at the inlet of pipe 111 can be maximized regardless of a long or short length of pipe 111.

In heating control in FIG. 11, in step S104, controller 100 checks an indoor temperature and an outdoor air temperature in carrying out heating control. Temperature sensors 10a and 10e can be used for checking. In checking, the temperature may be checked without operating each apparatus, or for example, a result of sensing after operation of an indoor or outdoor fan for an appropriate period of time may be used. In addition, controller 100 switches four-way valve 2 to a heating mode (a flow path in four-way valve 2 shown with a dashed line in FIG. 1). Expansion valves 42 and 43 are changed to initially set opening and expansion valve 41 is set to fixed opening (fully opened).

Thereafter, based on an operating state of the refrigeration cycle apparatus, expansion valve 43 is subjected to suction SH control in steps S105 and S106, and expansion valve 42 is subjected to intermediate pressure control in steps S107 and S108.

In step S105, controller 100 determines whether or not a temperature difference between temperature T10$f$ detected by temperature sensor 10$f$ and a temperature T10$a$ detected by temperature sensor 10$a$ is within a set range of superheating SH. When the temperature difference is within the set range (YES in S105), the process proceeds to step S107, and when the temperature difference is out of the set range (NO in S105), the process proceeds to step S106. When superheating SH is equal to or smaller than a lower limit of the set range, in step S106, there is possibility of the liquid refrigerant return state, and hence controller 100 throttles down expansion valve 43. When superheating SH is equal to or larger than an upper limit of the set range, a temperature at the time of delivery may excessively be high and hence the controller opens expansion valve 43. After opening of expansion valve 43 is changed in step S106, controller 100 maintains that opening for an appropriate time period and makes determination again in S105.

Opening of expansion valve 43 is preferably gradually changed because a state of the refrigeration cycle tends to be stable. In order to further shorten a time period for superheating SH to be within the set range, change in opening may be adjusted depending on magnitude of a difference from the set range. For example, when a difference between a threshold value and superheating SH is large, opening of the expansion valve may be controlled to increase, and when the difference between the threshold value and superheating SH is small, opening of the expansion valve may be controlled to decrease.

In step S107, controller 100 determines whether or not parameter ζ is equal to or larger than 1. Parameter ζ is expressed as ζ=ΔTdc/ΔTed. Temperature difference ΔTdc (=T10d−T10c) is a difference between a temperature at the outlet of indoor heat exchanger 6 (detected by temperature sensor 10d) and a temperature at the outlet of expansion valve 42 (detected by temperature sensor 10c). Temperature difference ΔTed (=T10e−T10d) is a difference between a temperature in the middle part of indoor heat exchanger 6 (detected by temperature sensor 10e) and a temperature at the outlet of indoor heat exchanger 6 (detected by temperature sensor 10d). Whether or not relation of ζ=(T10d−T10c)/(T10e−T10d)≥1 is satisfied is determined in step S107.

Whether or not ζ is within a range defined by set threshold values in consideration of a measurement error of a temperature sensor may be determined also similarly to ε.

When ζ is equal to or larger than the set threshold value (ζ≥1) (YES in S107), the process proceeds to step S109, and when ζ is smaller than the set threshold value (ζ<1) (NO in S107), the process proceeds to step S108.

Since refrigerant on a side of the outlet of expansion valve 42 is liquid in step S108, controller 100 throttles down expansion valve 42. After opening of expansion valve 42 is changed in step S108, controller 100 maintains that opening for an appropriate time period and thereafter makes determination again in S105.

When opening of expansion valve 43 is equal to or larger than the threshold value in step S109, control is completed, and when opening is smaller than the threshold value, the process proceeds to S110. In step S110, controller 100 throttles down expansion valve 42 and makes determination again in S105.

While supercooling SC and superheating SH are maintained within a target range under the control above, a degree of dryness at the inlet can be maximized regardless of a long or short length of pipe 111.

When supercooling SC is substantially not applied and there is a difference between temperatures detected by temperature sensors 10d and 10c, ζ is abnormally large and the difference between temperatures detected by temperature sensors 10f and 10a exhibits an abnormal value (suction SH being high). In that case, an amount of sealed refrigerant may basically be small or refrigerant may have leaked. For example, when ζ is larger than the set value [ex. ζ>30] and suction SH is equal to or larger than the set value [ex. suction SH>20], a user may be informed of insufficiency in amount of refrigerant through a remote controller or a display.

The refrigeration cycle apparatus according to the first embodiment described above achieves an effect below.

Conventionally, when an expansion valve is provided indoors in a model capable of switching between cooling and heating, high-pressure liquid refrigerant condensed in an outdoor unit in cooling flows as being in a liquid state through pipe 111 and becomes low-pressure two-phase refrigerant in an indoor expansion valve. According to the configuration shown in the present embodiment, refrigerant in pipe 111 can be converted to a two-phase state in any of cooling and heating.

By converting refrigerant in pipe 11 to the two-phase state, a density of refrigerant in the pipe can be lowered and an amount of sealed refrigerant can be decreased. By decreasing the amount of sealed refrigerant, a total GWP value (GWP of refrigerant×amount of refrigerant) can be decreased.

When refrigerant in the two-phase state flows into an expansion valve, due to variation in density of refrigerant per unit time, control of the expansion valve becomes difficult or capability (heating capability or cooling capability) becomes unstable. According to the configuration shown in the present embodiment, refrigerant on a side of the inlet of the controlled expansion valve can be in a liquid-phase state. By setting refrigerant on the side of the inlet of the controlled expansion valve to the liquid state, the operating state tends to be stabilized and control of the refrigeration cycle apparatus can be facilitated.

By controlling each expansion valve in accordance with ratio ε obtained from a result of sensing of a temperature before operation and the operating state and set suction SH, the operating state of the refrigeration cycle apparatus can be maintained in an optimal state.

By controlling opening of a high-pressure side expansion valve in accordance with the operating state, the result of sensing by the temperature sensor, and a state of opening of a low-pressure side expansion valve, the inlet of pipe 111 can be set to an optimal wet state regardless of a long or short length of pipe 111.

Though an outdoor air temperature may be estimated from a temperature detected by temperature sensor 10a before operation, an outdoor air temperature sensor may separately be provided.

By controlling each expansion valve in accordance with ratio ζ obtained from a temperature difference between a condensation temperature and a temperature at the inlet of the expansion valve and a difference in temperature between the inlet and the outlet of the expansion valve and set suction SH, the operating state of the refrigeration cycle apparatus can be maintained in an optimal state.

Second Embodiment

Figure 12:
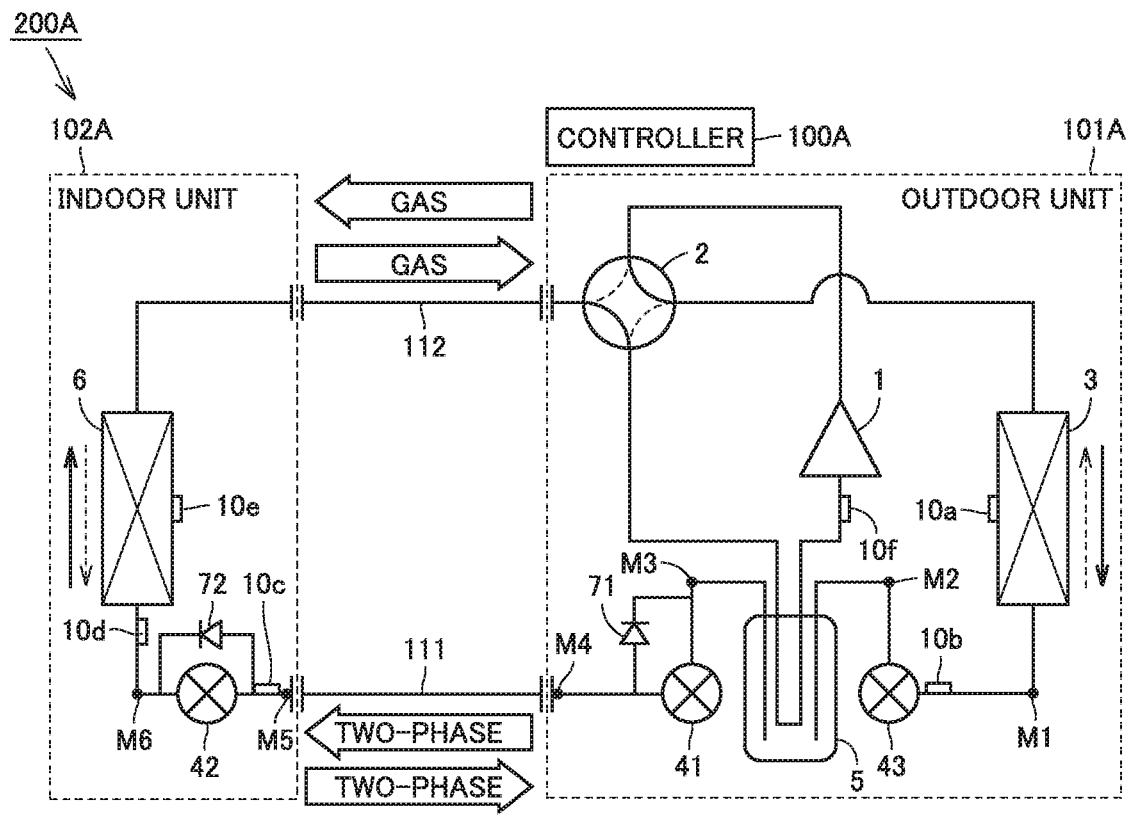
FIG. 12 is a diagram showing a configuration of a refrigeration cycle apparatus in a second embodiment.

FIG. 12 is a diagram showing a configuration of a refrigeration cycle apparatus in a second embodiment. In the second embodiment, two check valves are added to the configuration in FIG. 1. A refrigeration cycle apparatus 200A according to the second embodiment includes compressor 1, four-way valve 2, outdoor heat exchanger 3, expansion valve 43, expansion valve 41, expansion valve 42, receiver 5, indoor heat exchanger 6, a check valve 71, a check valve 72, temperature sensors 10a to 10f, and a controller 100A.

By setting the refrigerant state at inlets of at least two expansion valves to the liquid state in any operating state of cooling and heating also in refrigeration cycle apparatus 200A, control of the expansion valves is facilitated. By switching a method of controlling each expansion valve in accordance with an operating state, the operating state can be maintained, adaptation to long and short lengths of pipe 111 can be made, and an amount of refrigerant can be decreased.

A flow rate coefficient of check valves 71 and 72 shown in FIG. 12 is preferably equal to or larger than a flow rate coefficient when expansion valves 41 and 42 are fully opened. The number of check valves 7 is preferably equal to or larger than the number of expansion valves in an attachment portion.

Though an example in which the expansion valve and the check valve are arranged in combination is shown in FIG. 12, the expansion valve may be configured such that a flow rate coefficient of the expansion valve itself exhibits a special characteristic.

Figure 13:
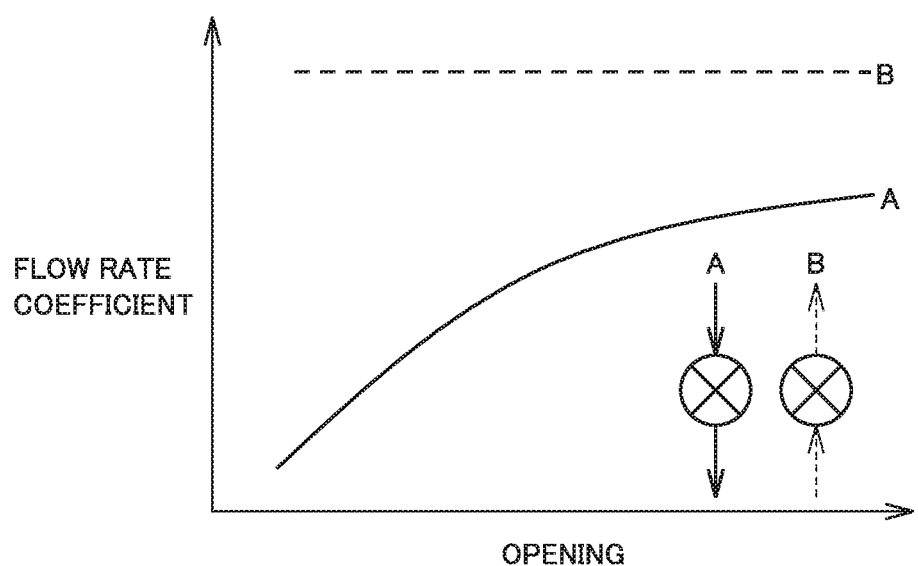
FIG. 13 is a characteristic line diagram in a first example of an expansion valve.
Figure 14:
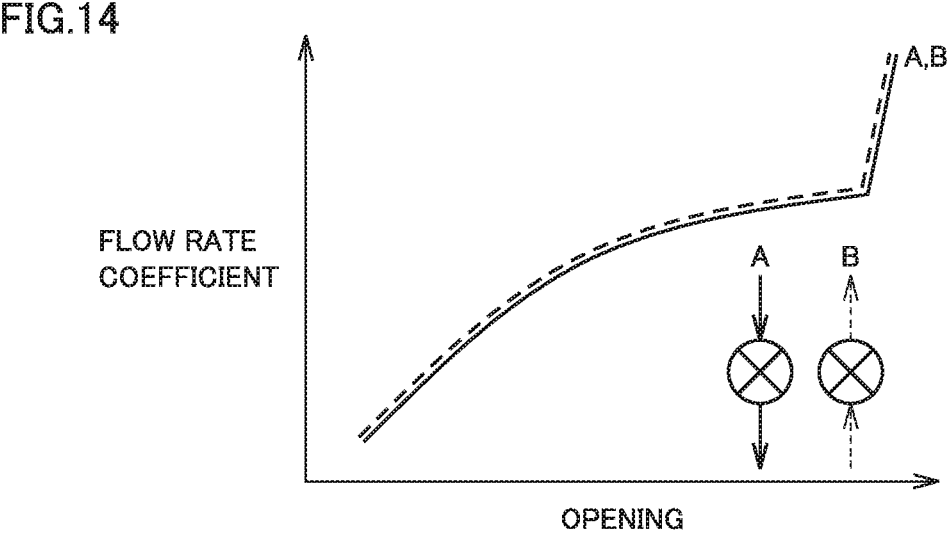
FIG. 14 is a characteristic line diagram in a second example of an expansion valve.

FIG. 13 is a characteristic line diagram in a first example of an expansion valve. FIG. 14 is a characteristic line diagram in a second example of an expansion valve.

In the expansion valve shown in FIG. 13, a characteristic of the flow rate coefficient is varied depending on a direction of flow of refrigerant. Specifically, directions A and B of flows of refrigerant have such a characteristic that relation of B>A is satisfied. An orientation of the expansion valve in a flow path is preferably determined such that the characteristic on the B side is exhibited when control denoted with "fully open" in FIG. 3 is carried out.

Alternatively, as shown in FIG. 14, regardless of a direction of flow of refrigerant, the characteristic may be such that the flow rate coefficient is greatly varied toward a flow rate characteristic of being fully open when opening is equal to or larger than certain opening. When control denoted with "fully open" in FIG. 3 is carried out, the expansion valve is preferably opened to opening in a region where a flow rate characteristic is varied.

In FIG. 12, the characteristic in FIG. 13 or 14 is realized based on combination of the expansion valve and the check valve. Though the characteristic in FIG. 13 or 14 is realized by adding a check valve in the embodiment of the present invention, an on-off valve may be provided instead of the check valve.

A basic operation by the refrigeration cycle apparatus in the second embodiment is the same as in the first embodiment. During cooling, two-phase refrigerant expanded in expansion valve 41 passes through expansion valve 42 and check valve 72 as being split, split refrigerant thereafter merges again, and merged refrigerant flows into indoor heat exchanger 6.

During heating, two-phase refrigerant expanded in expansion valve 42 passes through expansion valve 41 and check valve 71 as being split, split refrigerant thereafter merges again, and merged refrigerant flows into receiver 5.

The refrigeration cycle apparatus according to the second embodiment described above achieves an effect below.

As refrigerant that passes through the expansion valve of which opening is set under each operating state flows also to check valves 71 and 72, a circulation flow rate of refrigerant that flows through the expansion valve can be decreased. By lowering the circulation flow rate of refrigerant, pressure loss produced at the time of passage through the expansion valve can be lessened even though the flow rate coefficient is comparable. By lessening pressure loss in the expansion valve, pressure loss produced between M5 to M6 shown in the P-H chart in FIG. 5 and the like is lessened and expansion valve 41 can further be throttled down in achieving a comparably low pressure.

By throttling down expansion valve 41, a degree of dryness at the inlet of pipe 111 can be raised. By increasing the degree of dryness at the inlet of pipe 111, an average density of refrigerant in pipe 111 can be lowered. As the average density of refrigerant in pipe 111 is lower, an amount of sealed refrigerant necessary in achieving a comparable operating state can further be decreased. By decreasing the amount of sealed refrigerant, a total GWP value (GWP of refrigerant x amount of refrigerant) can be decreased.

In addition to the effect above, by providing an expansion valve with the characteristic shown in FIG. 13 or 14, a similar effect can be obtained without increasing the number of elements. Since the number of elements does not have to be increased, an effect of decrease in amount of refrigerant can be obtained without increase in manufacturing cost.

Third Embodiment

Figure 15:
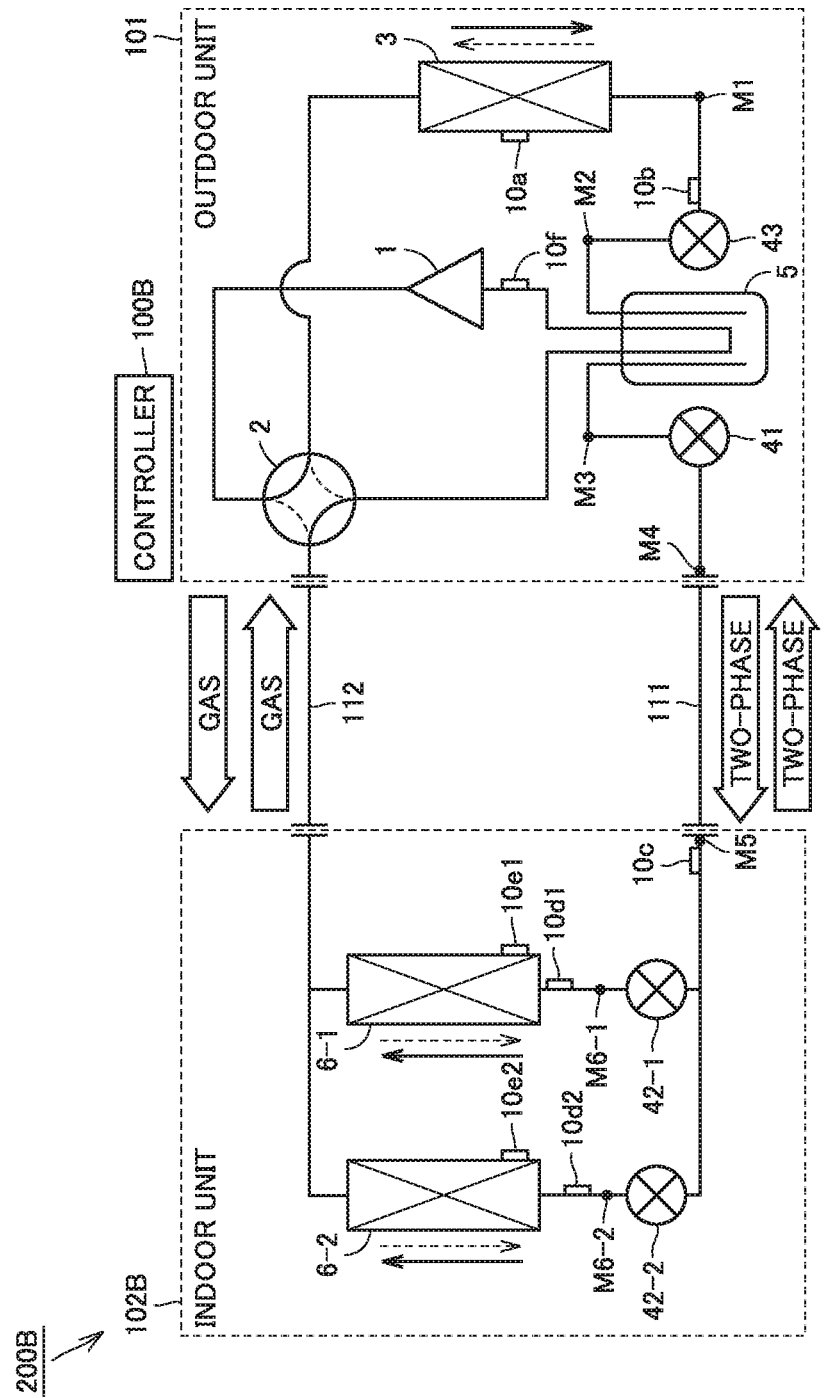
FIG. 15 is a circuit diagram of a refrigeration cycle apparatus 200B in a third embodiment.

An example in which a plurality of indoor units are connected to a single outdoor unit is introduced in a third embodiment. In this case, indoor units are assumed as being equal in load. FIG. 15 is a circuit diagram of a refrigeration cycle apparatus 200B in the third embodiment. Referring to FIG. 15, refrigeration cycle apparatus 200B includes compressor 1, four-way valve 2, outdoor heat exchanger 3, expansion valve 43, expansion valve 41, expansion valves 42-1 and 42-2, receiver 5, indoor heat exchangers 6-1 and 6-2, temperature sensors 10a to 10f, and a controller 100B.

Controller 100B facilitates control of refrigeration cycle apparatus 200B by controlling a state at inlets of at least two expansion valves to the liquid state in any operating state of cooling and heating, and switches a method of controlling each expansion valve and carries out control in accordance with an operating state. Thus, the operating state can be maintained, adaptation to long and short lengths of pipe 111 can be made, and an amount of refrigerant can be decreased.

Though a basic configuration of refrigeration cycle apparatus 200B is the same as in the first embodiment, refrigeration cycle apparatus 200B is different in that two or more indoor units are connected to a single outdoor unit. A check valve may be provided as in the second embodiment.

Figure 16:
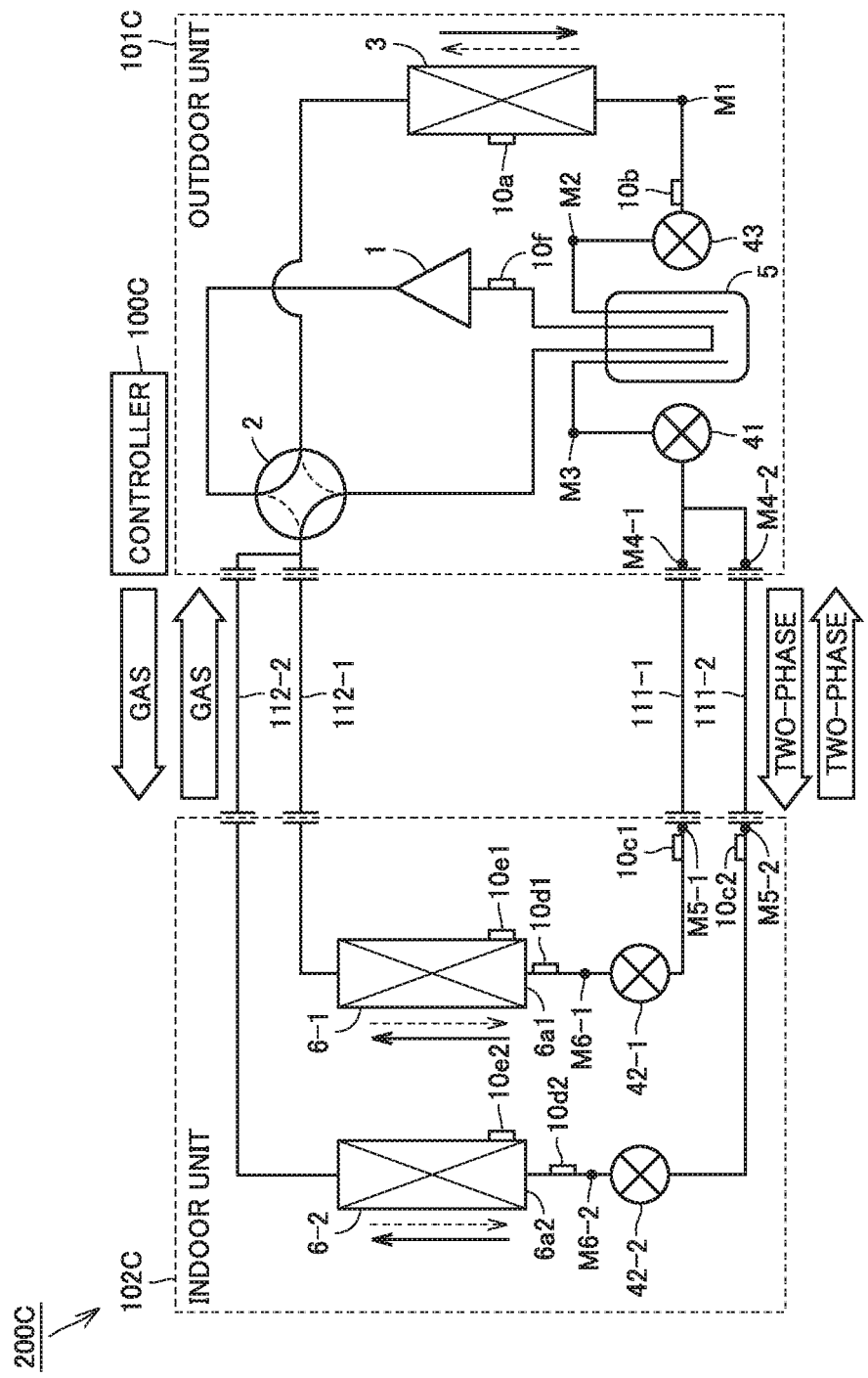
FIG. 16 is a circuit diagram of a refrigeration cycle apparatus 200C representing a modification of the third embodiment.

FIG. 16 is a circuit diagram of a refrigeration cycle apparatus 200C representing a modification of the third embodiment. In refrigeration cycle apparatus 200B in FIG. 15, two pipes 111 and 112 connect an outdoor unit 101B and an indoor unit 102B to each other as in the first embodiment. In contrast, in refrigeration cycle apparatus 200C, two sets of two pipes, that is, four pipes in total 111-1, 111-2, 112-1, and 112-2, connect outdoor unit 101C and indoor unit 102C to each other.

Basic operations by refrigeration cycle apparatuses 200B and 200C are the same as in the first embodiment.

Since refrigerant in the liquid pipe can be converted to the two-phase state even though a plurality of indoor units are connected to a single outdoor unit in the refrigeration cycle apparatus according to the third embodiment, an amount of sealed refrigerant can be decreased.

Since expansion valves 42-1 and 42-2 corresponding to respective indoor heat exchangers 6-1 and 6-2 are provided, refrigerant in the liquid pipe can be converted to the two-phase state regardless of whether a pair of pipes or two pairs of pipes connect(s) the outdoor unit and the indoor unit to each other.

Fourth Embodiment

In a fourth embodiment, a refrigeration cycle apparatus capable of adapting to an example in which an indoor load condition is different among a plurality of indoor heat exchangers when the plurality of indoor heat exchangers are provided for a single outdoor unit will be described.

Figure 17:
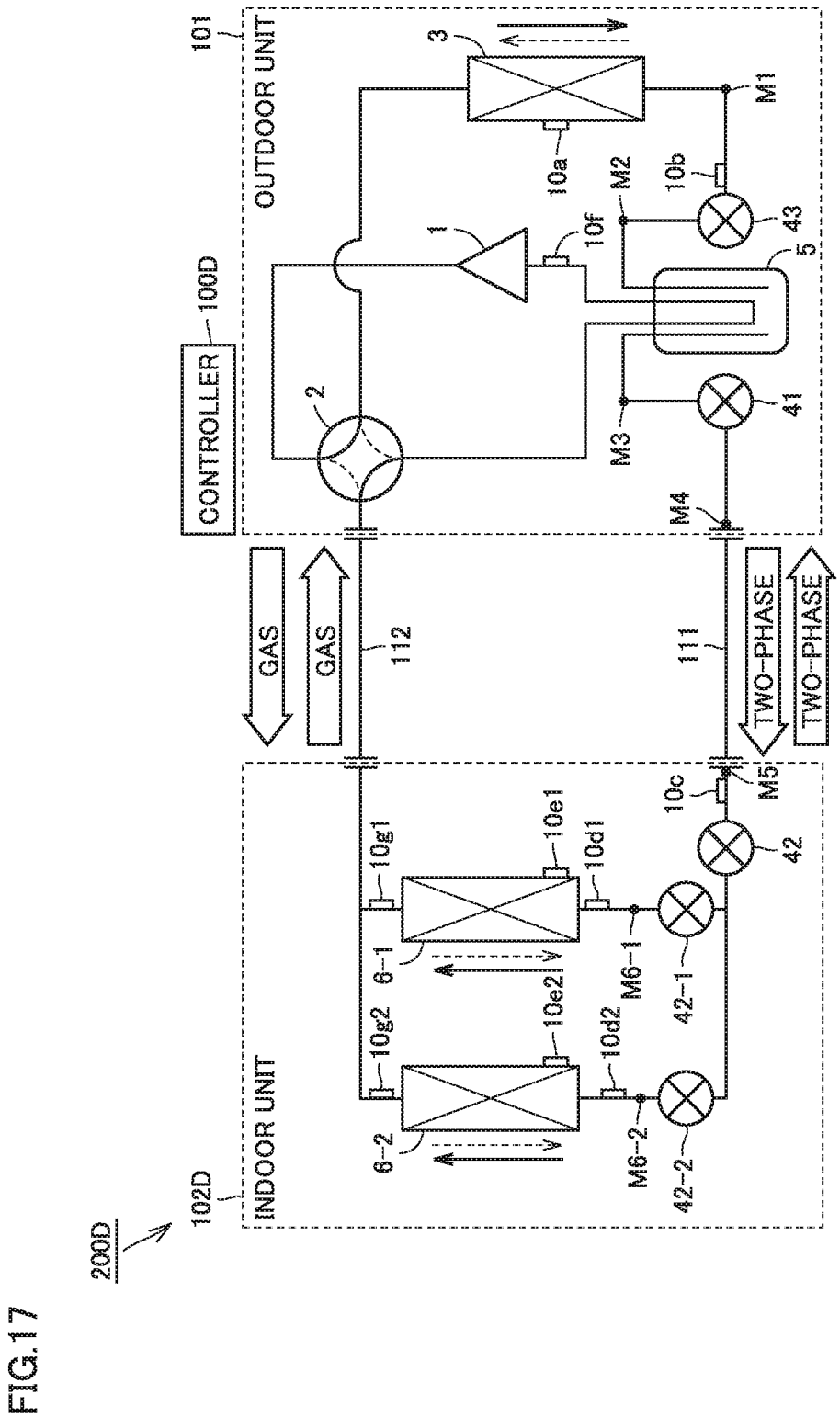
FIG. 17 is a circuit diagram of a refrigeration cycle apparatus 200D in a fourth embodiment.

FIG. 17 is a circuit diagram of a refrigeration cycle apparatus 200D in the fourth embodiment. Refrigeration cycle apparatus 200D shown in FIG. 17 includes compressor 1, four-way valve 2, outdoor heat exchanger 3, expansion valve 43, expansion valve 41, expansion valve 42, expansion valves 42-1 and 42-2, receiver 5, indoor heat exchangers 6-1 and 6-2, temperature sensors 10a to 10c, 10d1, 10d2, 10e1, 10e2, 10g1, 10g2, 10f, and a controller 100D.

Controller 100D facilitates control of refrigeration cycle apparatus 200D by setting a state at inlets of at least two expansion valves to the liquid state in any operating state of cooling and heating, and switches a method of controlling each expansion valve and carries out control in accordance with an operating state. Thus, the operating state can be maintained, adaptation to long and short lengths of pipe 111 can be made, and an amount of refrigerant can be decreased.

When a plurality of indoor heat exchangers are connected, an indoor load condition or an indoor temperature state may be different among the indoor heat exchangers. In that case, the third embodiment suffers from such a problem that states on the outlet sides of the individual indoor heat exchangers cannot be determined during cooling or such a problem that control is difficult in intermediate pressure control during heating because the outlet sides of expansion valves 42-1 and 42-2 are merged to establish a single state which is a control target whereas there are two expansion valves which are controlled objects.

The fourth embodiment addresses the problem above. Though a basic configuration of refrigeration cycle apparatus 200D in the fourth embodiment is the same as in the third embodiment, the refrigeration cycle apparatus is different in that expansion valve 42 is added in the vicinity of pipe 111 in addition to expansion valves 42-1 and 42-2 in each indoor unit and that temperature sensors 10g1 and 10g2 are added at outlets/inlets of respective indoor heat exchangers.

FIG. 18 is a diagram showing control of each expansion valve during cooling and heating in the fourth embodiment. A basic operation by refrigeration cycle apparatus 200D according to the fourth embodiment will now be described with reference to FIGS. 17 and 18.

Initially, in the cooling operation, refrigerant flows from compressor 1 through four-way valve 2 into outdoor heat exchanger 3 and is condensed. Refrigerant condensed in outdoor heat exchanger 3 is reduced in pressure in expansion valve 43. Controller 100D subjects expansion valve 43 to SC control ($\varepsilon$). Refrigerant reduced in pressure in expansion valve 43 passes through receiver 5 and is sent to expansion valve 41. Controller 100D subjects expansion valve 41 to suction SH control. Refrigerant reduced in pressure in expansion valve 41 is sent to indoor heat exchanger 6-1 and indoor heat exchanger 6-2 through pipe 111, expansion valve 42, and expansion valves 42-1 and 42-2. Controller 100D subjects expansion valves 42-1 and 42-2 to evaporation SH control. Controller 100D fixes opening of expansion valve 42 to fully open. Refrigerant that has evaporated in indoor heat exchangers 6-1 and 6-2 returns to compressor 1 through four-way valve 2 and receiver 5.

In the heating operation, refrigerant reaches indoor heat exchangers 6-1 and 6-2 from compressor 1 through four-way valve 2 and pipe 112 (gas pipe), and is condensed. Refrigerant condensed in indoor heat exchangers 6-1 and 6-2 is sent to expansion valves 42-1 and 42-2. Controller 100D subjects expansion valves 42-1 and 42-2 to SC control ($\varepsilon$). Refrigerant reduced in pressure in expansion valves 42-1 and 42-2 is merged and thereafter further reduced in pressure in expansion valve 42. Controller 100D subjects expansion valve 42 to intermediate pressure control. Refrigerant reduced in pressure in expansion valve 42 passes through pipe 111 (liquid pipe), expansion valve 41, and receiver 5, and is thereafter throttled down in expansion valve 43 and sent to outdoor heat exchanger 3. Controller 100D subjects expansion valve 43 to suction SH control. Controller 100D fixes opening of expansion valve 41 to fully open. Refrigerant that has evaporated in outdoor heat exchanger 3 returns to compressor 1 through four-way valve 2 and receiver 5.

A flow of control by controller 100D will be described with reference to FIGS. 9 and 19 to 20. Processing for determining the operation mode shown in FIG. 9 is performed similarly also in the fourth embodiment.

In step S1 in FIG. 9, the operation mode is determined. In determination processing, controller 100D may directly read user setting, may make determination in accordance with a state of the four-way valve controlled under the user setting, or may make determination based on a result of sensing of a temperature by a temperature sensor (for example, temperature sensor 10a or 10e1 (or 10e2)).

Processing in an example in which the operation mode is set to the cooling operation and the heating operation will sequentially be described below.

Figure 19:
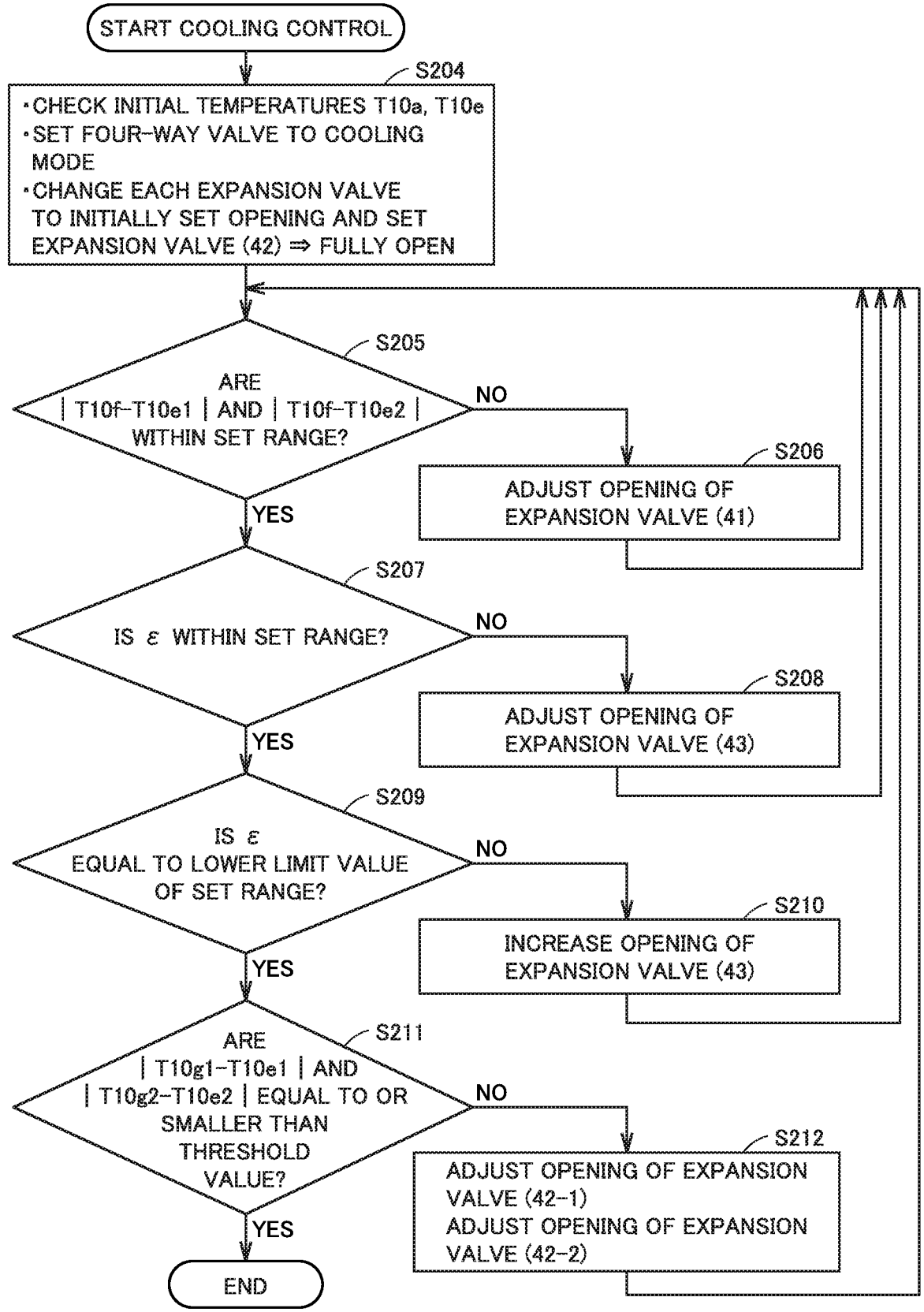
FIG. 19 is a flowchart showing processing in the cooling operation in the fourth embodiment.

FIG. 19 is a flowchart showing processing in the cooling operation in the fourth embodiment.

In step S204, in carrying out cooling control based on the result of determination, indoor and outdoor temperatures T10a and T10e are checked. Temperature sensors 10a and 10e1 (or 10e2) can be used for checking. In checking, the temperature may be checked without operating each apparatus, or for example, a result of sensing after operation of an indoor or outdoor fan for an appropriate period of time may be used. In addition, controller 100D switches four-way valve 2 to the cooling mode (a flow path in four-way valve 2 shown with a solid line in FIG. 17). Expansion valves 41, 42-1, 42-2, and 43 are changed to initially set opening and expansion valve 42 is set to fixed opening (fully opened).

Thereafter, based on the operating state of refrigeration cycle apparatus 200D, expansion valve 41 is subjected to suction SH control in steps S205 and S206, expansion valve 43 is subjected to SC control ($\varepsilon$) in steps S207 to S210, and expansion valves 42-1 and 42-2 are subjected to evaporation SH control in steps S211 and S212.

In step S205, controller 100D determines whether or not a temperature difference between temperature T10f detected by temperature sensor 10f and temperatures T10e1 and T10e2 detected by temperature sensors 10e1 and 10e2 is within a set range of superheating SH. When the temperature difference is within the set range (YES in S205), the process proceeds to step S207, and when the temperature difference is out of the set range (NO in S205), the process proceeds to step S206. When superheating SH is equal to or smaller than the lower limit of the set range, in step S206, controller 100D throttles down expansion valve 41, and when superheating is equal to or larger than the upper limit, the controller opens expansion valve 41. After opening of expansion valve 41 is changed, controller 100D maintains that opening of expansion valve 41 for an appropriate time period and makes determination again in step S205.

Opening of expansion valve 41 is preferably gradually changed because a state of the refrigeration cycle tends to be stable. In order to further shorten a time period for superheating SH to be within the set range, a degree of change in opening may be adjusted depending on magnitude of a difference from the set range. For example, when a difference between a threshold value and superheating SH is large, opening of the expansion valve may be controlled to increase, and when the difference between the threshold value and superheating SH is small, opening of the expansion valve may be controlled to decrease.

In step S207, controller 100D determines whether or not parameter $\varepsilon$ is within a range defined by the set threshold value. Parameter $\varepsilon$ [$\leq \varepsilon \leq 1$] is a value obtained based on a ratio between a temperature difference between the temperature in the middle part (temperature sensor 10a) of outdoor heat exchanger 3 and the temperature at the outlet (temperature sensor 10b) of outdoor heat exchanger 3 and a temperature difference between the temperature in the middle part (temperature sensor 10a) of outdoor heat exchanger 3 and a temperature sensed by temperature sensor 10a before operation.

When parameter $\varepsilon$ is within the range (YES in S207), the process proceeds to step S209, and when parameter $\varepsilon$ is out of the range (NO in S207), the process proceeds to step S208. When E is equal to or smaller than the lower limit of the set range, in step S208, a set value of supercooling SC obtained from a condensation temperature of the condenser (temperature sensor 10*a*) and a result of sensing of a temperature from an outlet of the condenser to an inlet of expansion valve 43 (temperature sensor 10*b*) has not been held, and hence expansion valve 43 is throttled down. When ε is equal to or larger than the upper limit, expansion valve 43 is opened. After opening of expansion valve 43 is changed, controller 100D maintains that opening of expansion valve 43 for an appropriate time period and makes determination again in step S205.

When ε is equal to the lower limit value of the set range in step S209, the process proceeds to step S211, and otherwise, processing in step S210 is performed. When ε is not equal to the lower limit value of the set range, in step S210, expansion valve 43 is opened so as to set E to the lower limit value and determination is made again in step S205.

While supercooling SC and superheating SH are maintained within a target range under the control above, necessary supercooling SC is secured and a degree of dryness at the inlet of pipe 111 can be maximized regardless of a long or short length of pipe 111.

In step S211, when a temperature difference between temperature sensor 10*g*1 and temperature sensor 10*e*1 and a temperature difference between temperature sensor 10*g*2 and temperature sensor 10*e*2 are both equal to or smaller than the threshold value, control ends, and otherwise, opening of expansion valve 42-1 and expansion valve 42-2 provided individually in the indoor unit is adjusted.

Figure 20:
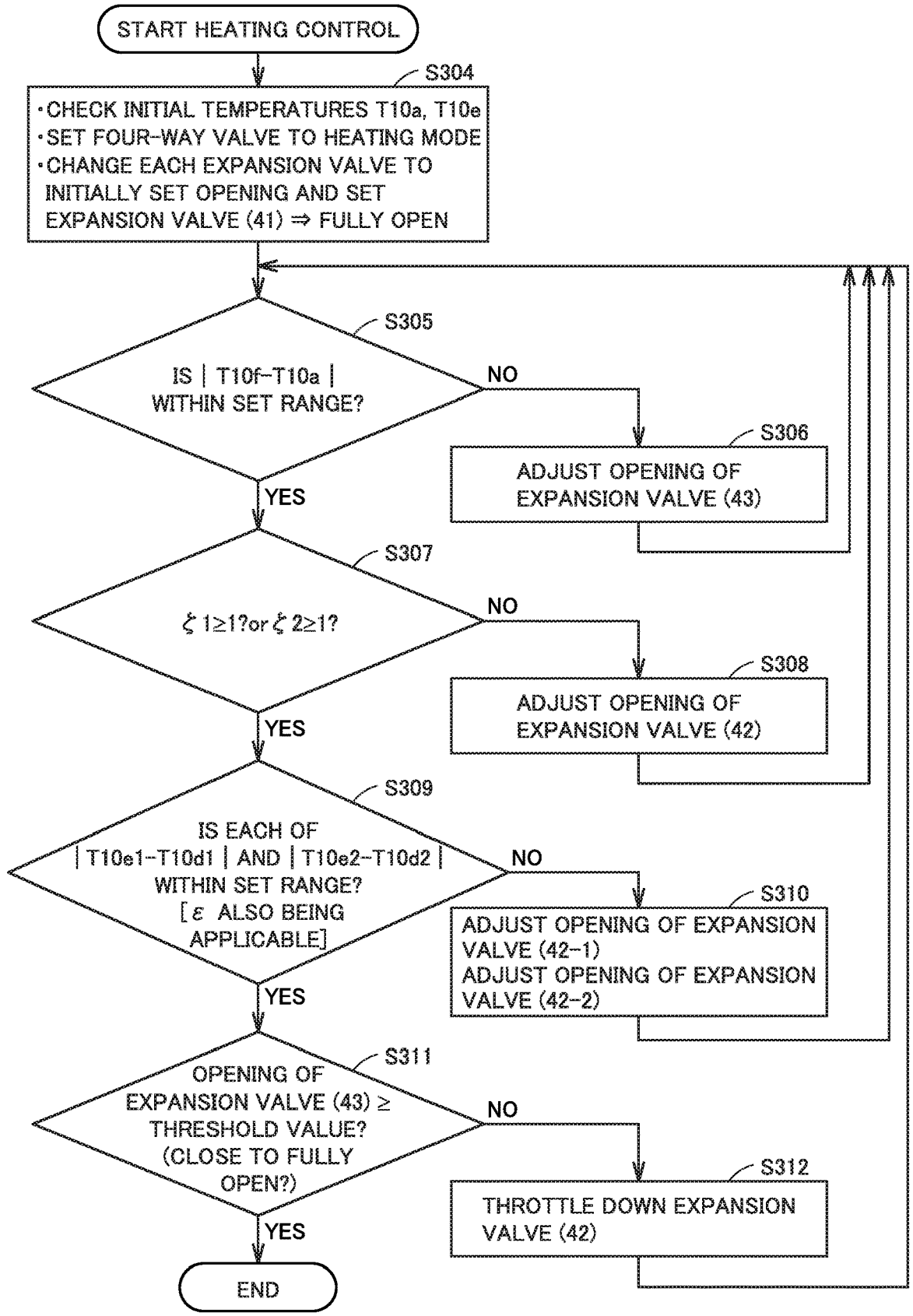
FIG. 20 is a flowchart showing processing in the heating operation in the fourth embodiment.

FIG. 20 is a flowchart showing processing in the heating operation in the fourth embodiment. Initially, in step S304, controller 100D checks an indoor temperature and an outdoor air temperature in carrying out heating control. Temperature sensors 10*a* and 10*e* can be used for checking. In checking, the temperature may be checked without operating each apparatus, or for example, a result of sensing after operation of an indoor or outdoor fan for an appropriate period of time may be used. In addition, controller 100D switches four-way valve 2 to the heating mode (a flow path in four-way valve 2 shown with a dashed line in FIG. 17). Expansion valves 42, 42-1, 42-2, and 43 are changed to initially set opening and expansion valve 41 is set to fixed opening (fully opened).

Thereafter, based on an operating state of the refrigeration cycle apparatus, expansion valve 43 is subjected to suction SH control in steps S305 and S306, and expansion valve 42 is subjected to intermediate pressure control in steps S307 and S308. In steps S309 and S310, expansion valves 42-1 and 42-2 are subjected to SC control (ε).

In step S305, controller 100D determines whether or not a temperature difference between temperature T10*f* detected by temperature sensor 10*f* and temperature T10*a* detected by temperature sensor 10*a* is within a set range of superheating SH. When the temperature difference is within the set range (YES in S305), the process proceeds to step S307, and when the temperature difference is out of the set range (NO in S305), the process proceeds to step S306. When superheating SH is equal to or smaller than a lower limit of the set range, in step S306, controller 100D throttles down expansion valve 43. When superheating SH is equal to or larger than an upper limit of the set range, the controller opens expansion valve 43. After opening of expansion valve 43 is changed in step S306, controller 100D maintains that opening for an appropriate time period and makes determination again in S305.

Opening of expansion valve 43 is preferably gradually changed because a state of the refrigeration cycle tends to be stable. In order to further shorten a time period for superheating SH to be within the set range, change in opening may be adjusted depending on magnitude of a difference from the set range. For example, when a difference between a threshold value and superheating SH is large, opening of the expansion valve may be controlled to increase, and when the difference between the threshold value and superheating SH is small, opening of the expansion valve may be controlled to decrease.

In step S307, controller 100D determines whether or not parameters ζ1 and ζ2 are equal to or larger than 1. Parameter cl is a value obtained based on a ratio between a temperature difference between a temperature in the middle part (temperature sensor 10*e*1) of indoor heat exchanger 6-1 and a temperature at the outlet (temperature sensor 10*d*1) of indoor heat exchanger 6-1 and a temperature difference between a temperature at the outlet (temperature sensor 10*d*1) of indoor heat exchanger 6-1 and a temperature at the outlet (temperature sensor 10*c*) of expansion valve 42. Parameter ζ2 is a value obtained based on a ratio between a temperature difference between a temperature in the middle part (temperature sensor 10*e*2) of indoor heat exchanger 6-2 and a temperature at the outlet (temperature sensor 10*d*2) of indoor heat exchanger 6-2 and a temperature difference between a temperature at the outlet (temperature sensor 10*d*2) of indoor heat exchanger 6-2 and a temperature at the outlet (temperature sensor 10*c*) of expansion valve 42.

Whether or not relation of ζ1=(T10*d*1−T10*c*)/(T10*e*1−T10*d*1)≥1 is satisfied or whether or not relation of ζ2=(T10*d*2−T10*c*)/(T10*e*2−T10*d*2)≥1 is satisfied is determined in step S307.

Whether or not ζ1 or ζ2 is within a set range in consideration of a measurement error of a temperature sensor may be determined also similarly to ε.

When ζ1 or ζ2 is equal to or larger than the set threshold value (YES in S307), the process proceeds to step S309, and when both of them are smaller than the set threshold value (ζ1<1 and ζ2<1) (NO in S307), the process proceeds to step S308.

Since pipe 111 is shared between two indoor heat exchangers, determination should only be made for any one of the indoor heat exchangers, and determination may be made for only one of ζ1 and ζ2.

When at least any one of ζ1 and ζ2 is equal to or larger than the set threshold value, the process proceeds to S309, and when at least any one of them is out of a range defined by the set threshold value (ζ<1), the process proceeds to S308.

Since refrigerant on the outlet side of expansion valve 42 is in the liquid state, in step S308, controller 100D throttles down expansion valve 42. When opening of expansion valve 42 is changed in step S308, controller 100D maintains that opening for an appropriate time period and thereafter makes determination again in S305.

In step S309, controller 100D determines whether or not supercooling (|T10*e*1−T10*d*1| and |T10*e*2−T10*d*2|) or ε of each of indoor heat exchangers 6-1 and 6-2 is within a range defined by the set threshold value. A set value of supercooling or ε of each indoor heat exchanger is set by outputting capability necessary for each indoor heat exchanger calculated based on a temperature difference between an indoor temperature and a set temperature and calculating a ratio of a circulation flow rate of refrigerant based on an enthalpy difference obtained from temperatures at the inlet and the outlet of each indoor heat exchanger and a condensation temperature.

When supercooling or E is within the range defined by the set threshold value in step S309, the process proceeds to S311, and when supercooling or ε is out of the range defined by the set threshold value, the process proceeds to S310. In step S310, when supercooling or ε is equal to or smaller than the lower limit value, expansion valve 42-1 or expansion valve 42-2 is throttled down, and when supercooling or ε is equal to or larger than the upper limit value, expansion valve 42-1 or expansion valve 42-2 is opened. When controller 100D changes opening of expansion valve 42-1 or expansion valve 42-2, it maintains changed opening for an appropriate time period and thereafter makes determination again in S305.

When opening of expansion valve 43 is equal to or larger than the threshold value in step S311, controller 100D completes control, and when opening is smaller than the threshold value, the controller performs processing in step S312. In step S312, expansion valve 42 is throttled down and determination is made again in step S305.

Under the control above, while supercooling SC and superheating SH are maintained within a target range in each heat exchanger, a degree of dryness at the inlet of pipe 111 can be maximized regardless of a long or short length of pipe 111.

The refrigeration cycle apparatus in the fourth embodiment achieves an effect below, in addition to the effects achieved by the refrigeration cycle apparatuses in the first to third embodiments.

When a plurality of indoor heat exchangers are connected, an indoor load condition or an indoor temperature state may be different. By providing temperature sensors 10g1 and 10g2 on the outlet sides of indoor heat exchangers 6-1 and 6-2, during cooling, a state on the side of the outlet of individual heat exchange can be determined and a ratio of circulation amounts of refrigerant in a plurality of indoor heat exchangers can be adjusted.

During heating, a controlled object and a control target satisfy a condition of 1:1 in each expansion valve so that control can be facilitated. In addition, adaptation to load generated in an individual indoor unit can be made. Furthermore, since a plurality of indoor units are provided for a single outdoor unit, cost can be reduced. A footprint on the outdoor side can be reduced.

Finally, the refrigeration cycle apparatuses according to the first to fourth embodiments are summarized with reference to the drawings.

Refrigeration cycle apparatuses 200 and 200A to 200C shown in FIGS. 1, 12, and 15 to 16 each include outdoor unit 101 including compressor 1, a first heat exchanger (outdoor heat exchanger 3), and first expansion valve 41, indoor unit 102 including second expansion valve 42 and a second heat exchanger (indoor heat exchanger 6), and first pipe 111 and second pipe 112 connected between outdoor unit 101 and indoor unit 102. In the cooling operation, refrigerant delivered from compressor 1 sequentially passes through the first heat exchanger (outdoor heat exchanger 3), first expansion valve 41, first pipe 111, second expansion valve 42, the second heat exchanger (indoor heat exchanger 6), and second pipe 112 and returns to compressor 1. In the cooling operation, first expansion valve 41 converts refrigerant from a liquid-phase state to a two-phase state and sends two-phase refrigerant to first pipe 111.

According to the present configuration, refrigerant in first pipe 111 can be converted to the two-phase state during cooling. By conversion to the two-phase state, a density in the pipe can be lowered and an amount of refrigerant sealed in the outdoor unit at the time of shipment of a product can be decreased. By decreasing the amount of sealed refrigerant, a total GWP value (GWP of refrigerant×total amount of refrigerant) can be decreased.

Preferably, outdoor unit 101 further includes third expansion valve 43 arranged between the first heat exchanger (outdoor heat exchanger 3) and first expansion valve 41 in a refrigerant circuit and a cooling unit arranged between first expansion valve 41 and third expansion valve 43 in the refrigerant circuit, the cooling unit cooling refrigerant that flows through a flow path that connects first expansion valve 41 and third expansion valve 43 to each other. For example, receiver 5 is defined as the cooling unit.

When refrigerant in the two-phase state flows into an expansion valve, due to variation in density per unit time, control of the expansion valve becomes difficult or capability (cooling capability) is unstable. According to the configuration above, refrigerant on the side of the inlet of controlled first expansion valve 41 can be in the liquid state. By setting refrigerant on the side of the inlet of controlled first expansion valve 41 to the liquid state, the operating state tends to be stabilized and control of the entire refrigeration cycle apparatus can be facilitated.

Preferably, the refrigeration cycle apparatus further includes first temperature sensor 10a that senses a temperature of refrigerant that flows through the first heat exchanger, second temperature sensor 10b that senses a temperature of refrigerant in a flow path between the first heat exchanger and the third expansion valve, third temperature sensor 10f that senses a temperature of refrigerant suctioned into the compressor, fourth temperature sensor 10e that senses a temperature of refrigerant that flows through the second heat exchanger, and controller 100 that controls opening of the first to third expansion valves.

In the cooling operation, the controller controls opening of first expansion valve 41 so as to set a difference between a temperature detected by fourth temperature sensor 10e and a temperature detected by third temperature sensor 10f to a predetermined value. In the cooling operation, the controller controls opening of third expansion valve 43 so as to set a value (ε) obtained based on a ratio between a difference between a temperature detected by first temperature sensor 10a and a temperature detected by second temperature sensor 10b and a difference between an outdoor air temperature and the temperature detected by first temperature sensor 10a to be within a predetermined set range in the cooling operation.

By controlling each expansion valve in accordance with ratio ε obtained from a result of sensing of the temperature before operation and the operating state and set suction SH, the operating state can be maintained in an optimal state.

By controlling opening of a high-pressure side expansion valve in accordance with the operating state, the result of sensing by the temperature sensor, and a state of opening of a low-pressure side expansion valve, the inlet of pipe 111 can be set to an optimal wet state regardless of a long or short length of pipe 111.

An outdoor air temperature may be estimated from a temperature sensor before operation, or an exhaust temperature sensor may separately be provided.

More preferably, in the heating operation, refrigerant delivered from compressor 1 sequentially passes through second pipe 112, the second heat exchanger (indoor heat exchanger 6), second expansion valve 42, first pipe 111, first expansion valve 41, and the first heat exchanger (outdoor heat exchanger 3) and returns to compressor 1. In the heating operation, second expansion valve 42 converts refrigerant from a liquid-phase state to a two-phase state and sends two-phase refrigerant to first pipe 111.

Further preferably, refrigeration cycle apparatus 200 further includes four-way valve 2 that switches between the cooling operation and the heating operation.

In a model that is capable of switching between cooling and heating and includes a single expansion valve, when the expansion valve is provided on the side of the indoor unit, pipe 111 can be in the two-phase state during heating, however, during cooling, high-pressure liquid refrigerant condensed in the outdoor unit flows through pipe 111 as being in the liquid state and becomes low-pressure two-phase refrigerant in the expansion valve. When the expansion valve is provided on the side of the outdoor unit, during cooling, pipe 111 can be in the two-phase state, however, during heating, high-pressure liquid refrigerant condensed in the outdoor unit flows through pipe 111 as being in the liquid state and becomes low-pressure two-phase refrigerant in the expansion valve. In contrast, by providing expansion valve 41 in the outdoor unit and providing expansion valve 42 in the indoor unit in the model capable of switching between cooling and heating, refrigerant in pipe 111 can be in the two-phase state in any of cooling and heating.

By converting refrigerant in first pipe 111 to the two-phase state, a density in the pipe can be lowered and an amount of refrigerant sealed in the outdoor unit at the time of shipment of a product can be decreased. By decreasing the amount of sealed refrigerant, a total GWP value (GWP of refrigerant×total amount of refrigerant) can be decreased.

Further preferably, refrigeration cycle apparatus 200 further includes first temperature sensor 10a that senses a temperature of refrigerant that flows through the first heat exchanger, second temperature sensor 10b that senses a temperature of refrigerant in a flow path between the first heat exchanger and the third expansion valve, third temperature sensor 10f that senses a temperature of refrigerant suctioned into the compressor, fourth temperature sensor 10e that senses a temperature of refrigerant that flows through the second heat exchanger, fifth temperature sensor 10d that senses a temperature of refrigerant in a flow path between the second heat exchanger and the second expansion valve, sixth temperature sensor 10c that senses a temperature of refrigerant on a side of connection of second expansion valve 42 to first pipe 111, and controller 100 that controls opening of the first to third expansion valves. The controller controls opening of third expansion valve 43 so as to set a difference between a temperature detected by first temperature sensor 10a and a temperature detected by third temperature sensor 10f to a predetermined value in the heating operation. The controller controls opening of second expansion valve 42 so as to set a value obtained based on a ratio between a difference between a temperature detected by fourth temperature sensor 10e and a temperature detected by fifth temperature sensor 10d and a difference between the temperature detected by fourth temperature sensor 10e and a temperature detected by sixth temperature sensor 10c to a predetermined value in the heating operation.

By controlling each expansion valve in accordance with ratio ζ obtained based on a temperature difference between a condensation temperature and the temperature at the inlet of the expansion valve and a difference in temperature between the inlet and the outlet of the expansion valve and set suction SH, the operating state can be maintained in an optimal state.

By controlling opening of a high-pressure side expansion valve in accordance with the operating state, the result of sensing by the temperature sensor, and a state of opening of a low-pressure side expansion valve, the inlet of pipe 111 can be set to an optimal wet state regardless of a long or short length of pipe 111.

Further preferably, third expansion valve 43 converts refrigerant from a liquid-phase state to a two-phase state.

Further preferably, the cooling unit includes receiver 5 configured to exchange heat between refrigerant suctioned by compressor 1 and refrigerant that flows through a flow path that connects first expansion valve 41 and third expansion valve 43 to each other.

As shown in FIG. 17, refrigeration cycle apparatus 200D includes outdoor unit 101 including compressor 1, a first heat exchanger (outdoor heat exchanger 3), and first expansion valve 41, indoor unit 102 including second expansion valve 42 and a second heat exchanger (indoor heat exchanger 6-1), and first pipe 111 and second pipe 112 connected between outdoor unit 101 and indoor unit 102. In the cooling operation, refrigerant delivered from compressor 1 sequentially passes through the first heat exchanger (outdoor heat exchanger 3), first expansion valve 41, first pipe 111, second expansion valve 42, the second heat exchanger (indoor heat exchanger 6-1), and second pipe 112 and returns to compressor 1. In the cooling operation, first expansion valve 41 converts refrigerant from a liquid-phase state to a two-phase state and sends two-phase refrigerant to first pipe 111. Preferably, an indoor unit 102D further includes a third heat exchanger (indoor heat exchanger 6-2), fourth expansion valve 42-1, and fifth expansion valve 42-2. The second heat exchanger (indoor heat exchanger 6-1) and fourth expansion valve 42-1 are connected in series to define a first flow path. The third heat exchanger (indoor heat exchanger 6-2) and fifth expansion valve 42-2 are connected in series to define a second flow path. The first flow path and the second flow path are connected in parallel between second expansion valve 42 and second pipe 112.

According to the configuration above, when there are a plurality of heat exchangers on the indoor side and they are different in load, capability of the indoor heat exchanger can be adapted to the load while refrigerant in first pipe 111 is in the two-phase state.

It should be understood that the embodiments disclosed herein are illustrative and non-restrictive in every respect. The scope of the present invention is defined by the terms of the claims rather than the description of the embodiments above and is intended to include any modifications within the scope and meaning equivalent to the terms of the claims.

The invention claimed is:

1. A refrigeration cycle apparatus comprising:
   an outdoor unit comprising a compressor, a first heat exchanger, and a first expansion valve;
   an indoor unit comprising a second expansion valve and a second heat exchanger; and
   a first pipe and a second pipe connected between the outdoor unit and the indoor unit,
   in a cooling operation, refrigerant delivered from the compressor sequentially passing through the first heat exchanger, the first expansion valve, the first pipe, the second expansion valve, the second heat exchanger, and the second pipe and returning to the compressor,
   in the cooling operation, the first expansion valve being configured to convert refrigerant from a liquid-phase state to a two-phase state and send two-phase refrigerant to the first pipe, wherein
   the outdoor unit further comprises a third expansion valve arranged between the first heat exchanger and the first expansion valve in a refrigerant circuit, and a cooling unit arranged between the first expansion valve and the third expansion valve in the refrigerant circuit, the cooling unit is configured to cool refrigerant that flows through a flow path that connects the first expansion valve and the third expansion valve to each other, and further comprising:

a first temperature sensor configured to sense a temperature of refrigerant that flows through the first heat exchanger;

a second temperature sensor configured to sense a temperature of refrigerant in a flow path between the first heat exchanger and the third expansion valve;

a third temperature sensor configured to sense a temperature of refrigerant suctioned into the compressor;

a fourth temperature sensor configured to sense a temperature of refrigerant that flows through the second heat exchanger; and a controller configured to control opening of the first to third expansion valves, wherein the controller is configured to control opening of the first expansion valve so as to set a difference between a temperature detected by the fourth temperature sensor and a temperature detected by the third temperature sensor to a predetermined value in the cooling operation, and the controller is configured to control opening of the third expansion valve so as to set a value obtained based on a ratio between a difference between a temperature detected by the first temperature sensor and a temperature detected by the second temperature sensor and a difference between an outdoor air temperature and the temperature detected by the first temperature sensor to be within a predetermined set range in the cooling operation.

2. The refrigeration cycle apparatus according to claim 1, wherein the cooling unit is configured to exchange heat between refrigerant suctioned by the compressor and refrigerant that flows through the flow path that connects the first expansion valve and the third expansion valve to each other.

3. The refrigeration cycle apparatus according to claim 1, wherein the indoor unit further comprises a third heat exchanger, a fourth expansion valve, and a fifth expansion valve, the second heat exchanger and the fourth expansion valve are connected in series to define a first flow path, the third heat exchanger and the fifth expansion valve are connected in series to define a second flow path, and the first flow path and the second flow path are connected in parallel between the second expansion valve and the second pipe.

4. The refrigeration cycle apparatus according to claim 1, wherein the cooling unit comprises a receiver configured to exchange heat between refrigerant suctioned by the compressor and refrigerant that flows through a flow path that connects the first expansion valve and the third expansion valve to each other, in a heating operation, refrigerant delivered from the compressor sequentially passes through the second pipe, the second heat exchanger, the second expansion valve, the first pipe, the first expansion valve, and the first heat exchanger and returns to the compressor, and in the heating operation, the second expansion valve is configured to convert refrigerant from a liquid-phase state to a two-phase state and send two-phase refrigerant to the first pipe.

5. The refrigeration cycle apparatus according to claim 4, further comprising a four-way valve that switches between the cooling operation and the heating operation.

6. The refrigeration cycle apparatus according to claim 4, further comprising:

a fifth temperature sensor configured to sense a temperature of refrigerant in a flow path between the second heat exchanger and the second expansion valve;

a sixth temperature sensor configured to sense a temperature of refrigerant on a side of connection of the second expansion valve to the first pipe;

wherein the controller is configured to control opening of the third expansion valve so as to set a difference between a temperature detected by the first temperature sensor and a temperature detected by the third temperature sensor to a predetermined value in the heating operation, and the controller is configured to control opening of the second expansion valve so as to set a value obtained based on a ratio between a difference between a temperature detected by the fourth temperature sensor and a temperature detected by the fifth temperature sensor and a difference between the temperature detected by the fifth temperature sensor and the temperature detected by the sixth temperature sensor to a predetermined value in the heating operation.

* * * * *